United States Patent
Mishra et al.

(10) Patent No.: US 9,252,997 B1
(45) Date of Patent: Feb. 2, 2016

(54) DATA LINK POWER REDUCTION TECHNIQUE USING BIPOLAR PULSE AMPLITUDE MODULATION

(71) Applicant: QUALCOMM Incorporated, San Diego, CA (US)

(72) Inventors: Lalan Jee Mishra, San Diego, CA (US); Timothy Mowry Hollis, Poway, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 14/328,556

(22) Filed: Jul. 10, 2014

(51) Int. Cl.
*H04L 25/49* (2006.01)
*H04L 27/06* (2006.01)
*H04L 25/06* (2006.01)

(52) U.S. Cl.
CPC ............ *H04L 25/4927* (2013.01); *H04L 25/06* (2013.01); *H04L 27/06* (2013.01)

(58) Field of Classification Search
USPC .................................. 375/214, 241, 265, 219
See application file for complete search history.

(56) References Cited

U.S. PATENT DOCUMENTS

| | | | |
|---|---|---|---|
| 5,872,468 A | 2/1999 | Dyke | |
| 6,477,205 B1 | 11/2002 | Doblar et al. | |
| 6,993,067 B1 * | 1/2006 | Betts et al. | 375/214 |
| 7,308,058 B2 | 12/2007 | Zerbe et al. | |
| 7,391,834 B2 | 6/2008 | Casper et al. | |
| 7,528,629 B2 | 5/2009 | Farjadrad et al. | |
| 7,639,098 B2 | 12/2009 | Schell et al. | |
| 8,320,494 B2 | 11/2012 | Zerbe et al. | |
| 2010/0188175 A1 | 7/2010 | Ishibashi | |
| 2011/0222623 A1 | 9/2011 | Hollis | |
| 2013/0195155 A1 * | 8/2013 | Pan et al. | 375/219 |
| 2015/0071651 A1 * | 3/2015 | Asmanis et al. | 398/141 |

OTHER PUBLICATIONS

Co-pending U.S. Appl. No. 14/089,683, filed Nov. 25, 2013.
International Search Report and Written Opinion—PCT/US2015/030992—ISA/EPO—Jul. 16, 2015(140794WO).

* cited by examiner

*Primary Examiner* — Eva Puente
(74) *Attorney, Agent, or Firm* — Procopio, Cory, Hargreaves & Savitch LLP

(57) ABSTRACT

High-speed data links between a processor and off-chip DRAM utilizes pulse-amplitude-modulation (PAM) signaling to increase data rate for a given bandwidth and resource budget in SoCs. However, the termination resistor used in the transmission line interface between processor and DRAM consumes large amounts of power during PAM signaling. By adding a biasing source between Ground and the termination resistor, the "floor voltage" that the termination resistor uses as a reference for determining signaling levels may be raised. Raising the floor voltage reduces the amount of voltage across the termination resistor and reduces power consumption accordingly. The biasing source is adjusted to various increments of the maximum amplitude of the PAM signaling. A floor voltage of one-half of the maximum amplitude of PAM signaling produces minimum power consumption in the receiver. Additionally, data inversion pre-coding may be concatenated with the floor voltage adjustment to further maximize power savings of the interface.

29 Claims, 16 Drawing Sheets

DATA LINK POWER REDUCTION TECHNIQUE USING BIPOLAR PULSE AMPLITUDE MODULATION

BACKGROUND

1. Field

Aspects of the present disclosure generally relate to high-speed data communications interfaces, and more particularly, to pulse-amplitude-modulation-encoded data-communication links.

2. Background

Manufacturers of mobile devices, such as cellular phones, may deploy various electronic components in one or more integrated circuit (IC) devices and/or on one or more circuit boards. The electronic components may include processing devices, storage devices, communications transceivers, display drivers, and the like. In one example, a processing device may be provided on a printed circuit board (PCB) and may communicate with one or more memories on the same PCB and/or on a different PCB. The processor may communicate with the memory devices using a high-speed communications link that supports unidirectional and bidirectional channels for data and control signals.

In a multi-wire interface, the power consumption associated with a communications link can be significant in relation to a power budget available in a mobile wireless device. The power consumed by the communications link may be determined to some extent by one or more of Bus width, driver types used to transmit data on a transmission line, geometry and structure of the transmission line, encoding format, frequency of switching, logic states, which may be defined by voltage and current levels of an encoding scheme, and so on.

Pulse-amplitude modulation (PAM) is a particular implementation of line coding techniques. PAM signaling can be used in high-speed data transmission schemes to implement data transfers. PAM line coding encodes message symbols (data symbols) into a pulse having an amplitude corresponding to the encoded data symbol. For example, each data symbol may be encoded into a pulse having a unique amplitude. Data symbols may have a one-to-one correspondence in mapping to pulse amplitudes or transmission symbols. PAM signaling on a channel involves the transmission of pulses with various amplitudes to a receiver on a single physical line.

In the PAM receiver, a termination resistor may be coupled between the transmission line and Ground (Gnd) to receive PAM signaling. The termination resistor value is generally selected to match the characteristic impedance of the transmission line and may be implemented as a fixed-value resistor. In some embodiments, the termination resistor could be implemented with an active device like a transistor. As PAM signaling is applied across the termination resistor, the voltage level across the termination resistor is measured to determine the amplitude of a particular PAM pulse. PAM signaling that causes positive and negative values of pulses across the termination resistor is a further aspect of line coding and may be referred to as bipolar encoding. The amplitude of the PAM pulse is used as the index into a lookup table to decode a data symbol that corresponds to the transmission symbol.

In PAM-4 signaling, four discrete pulse amplitudes makeup the encoded transmission symbols. As PAM-4 signaling is applied to the receiver, significant power is lost in the termination resistor. Currently, high speed data links using PAM-4 use a fixed resistor termination scheme with a unidirectional current flow mechanism. Each PAM-4 pulse produces an amount of current in the receiver proportional to the magnitude of the pulse across the termination resistor.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to an aspect, an apparatus is provided that includes a receiver that includes a termination resistor that is communicatively coupled through a first termination-resistor node to a data-link terminal and through a second termination-resistor node to a biasing terminal, the termination resistor is configured to receive multi-level signaling and generate corresponding polarized voltages and currents according to an amplitude of received multi-level signaling. The receiver also includes a biasing source that is communicatively coupled through a first biasing-source node to the biasing terminal and through a second biasing-source node to Ground and is configured to selectively generate a biasing-voltage level on the biasing terminal and a multi-level decoder that is communicatively coupled across the termination resistor and to an index port, the multi-level decoder is configured to receive the polarized voltages and currents, and determine one of a set of compound-index entries according to the multi-level signaling. The apparatus may also include a lookup table communicatively coupled to the index port and include an array of data symbols and a corresponding index, the lookup table is configured to receive one in the set of compound-index entries and retrieve an associated data symbol from the array of data symbols corresponding to a respective entry in the set of compound-index entries. In some cases, the lookup table could be replaced by simple combinational logic circuitry.

According to a further aspect, a method commences by selectively adjusting a biasing-voltage level being applied to a termination resistor, the termination resistor is communicatively coupled to a data-link terminal of a receiver and to a biasing terminal. The method continues by receiving a pulse-amplitude-modulation signal through the data-link terminal, across the termination resistor, and through the biasing terminal and according to the pulse-amplitude-modulation signal, measures a voltage level across, and a current through the termination resistor. The method continues by aggregating a compound index including the measured voltage level and the measured current, and selectively accessing a message symbol in a message symbol array within a lookup table according to the compound index. The method concludes by retrieving the message symbol from the lookup table according to the compound-index access.

A further aspect is an apparatus comprising a receiver that includes a termination resistor that is communicatively coupled through a first termination-resistor node to a data-link terminal and through a second termination-resistor node to a biasing terminal, the termination resistor is configured to receive multi-level signaling and generate corresponding polarized voltages and currents. The receiver also includes a biasing source that is communicatively coupled through a first biasing-source node to the biasing terminal and through a second biasing-source node to Ground and is configured to selectively generate a biasing-voltage level on the biasing terminal. Additionally, the receiver includes a multi-level decoder communicatively coupled across the termination resistor and configured to determine respective entries from a set of compound-index entries according to the polarized voltages and currents across the termination resistor. The multi-level decoder includes a level decoder and a current sensor, where each is communicatively coupled through input nodes across the termination resistor. The level decoder is configured to determine a first portion and, the current sensor a second portion, of respective entries of a set of compound-index entries. The receiver also includes level decode logic communicatively coupled to the level decoder and the current sensor, the level decode logic decodes an array of transmission symbols according to a corresponding index, the level decode logic is configured to receive a respective entry from the set of compound-index entries and apply the entry to the index to retrieve an associated message symbol from the array of transmission symbols. The apparatus additionally includes an inversion-indicator node coupled through an indication terminal to the inverted-data decoder, and an inverted-data decoder coupled to the lookup table and the inversion-indicator node, and configured to decode inverse-data symbols to data symbols.

A further aspect of the present disclosure is a system that includes a transmitter memory that is configured to store and retrieve a data symbol corresponding to a message and a multi-level encoder that is communicatively coupled to the transmitter memory and is configured to encode a received data symbol to a multi-level transmission symbol. The system includes a transmitter that is communicatively coupled to the multi-level encoder and a data-link terminal, and is configured to transmit the encoded multi-level transmission symbol according to a multi-level signaling protocol and a communications link that is communicatively coupled to the transmitter through the data-link terminal and is configured to propagate multi-level signaling. The system also includes a receiver that is communicatively coupled to the transmitter through the communications link and is configured to receive the multi-level transmission symbol according to the multi-level signaling protocol and a receiver memory that is communicatively coupled to the receiver and is configured to store data symbols corresponding to the message.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
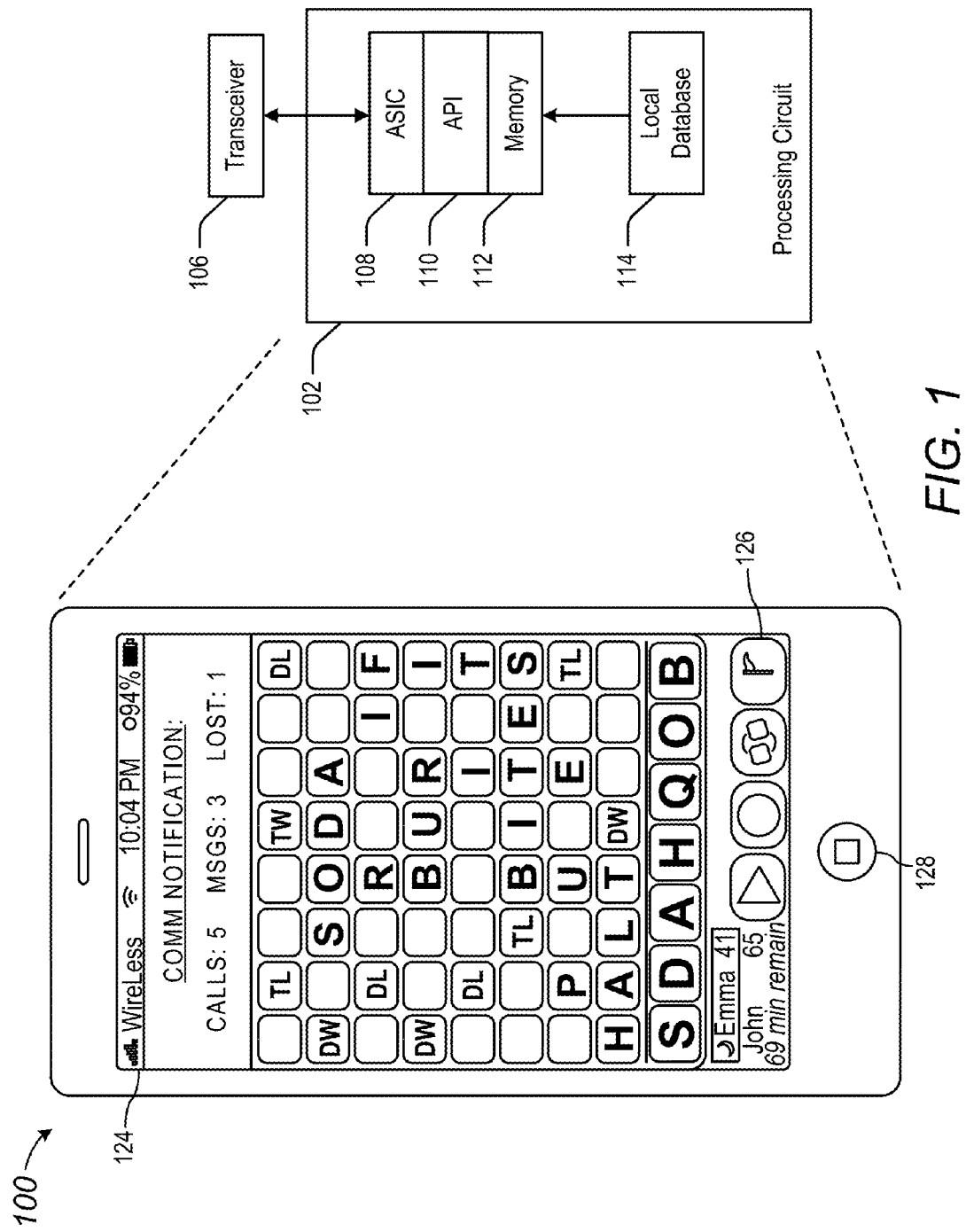
FIG. 1 depicts an apparatus employing a pulse-amplitude-modulation data link between SoC devices, according to certain example embodiments.

FIG. 1 depicts an apparatus employing a pulse-amplitude-modulation (PAM) data link between SoC devices, according to certain example embodiments. Certain aspects of the invention may be applicable to communications links deployed between electronic devices that may include subcomponents of an apparatus such as a telephone, a mobile computing device, an appliance, automobile electronics, avionics systems, etc. In one example, the apparatus 100 may comprise a wireless communication device that communicates through an RF transceiver with a radio access network (RAN), a core access network, the Internet and/or another network. The apparatus 100 may include a communications transceiver 106 operably coupled to processing circuit 102.

The processing circuit 102 may comprise one or more IC devices, such as an application-specific-integrated circuit (ASIC) 108. The ASIC 108 may include one or more processing devices, logic circuits, and so on. The processing circuit 102 may include and/or be coupled to processor-readable storage such as a memory 112 that may maintain instructions and data that may be executed by the processing circuit 102. The processing circuit 102 may be controlled by one or more of an operating system and an application programming interface (API) layer 110 that supports and enables execution of software modules residing in storage media, such as the memory 112 of the wireless device. The memory 112 may include read-only memory (ROM), random-access memory (RAM), dynamic-random-access memory (DRAM), electrically erasable programmable ROM (EEPROM), flash cards, or any memory that can be used in processing systems and computing platforms. The processing circuit 102 may include or access a local database 114 that can maintain operational parameters and other information used to configure and operate apparatus 100. The local database 114 may be implemented using one or more of a database module, flash memory, magnetic media, EEPROM, optical media, tape, soft or hard disk, or the like. The processing circuit may also be operably coupled to external devices such as a display 124, operator controls, such as a button 128 and/or a keypad 126 among other components.

Various devices within the apparatus 100 may be interconnected using a communications link that includes a number of conductors. The High-speed-data links may be used in a system-on-chip (SoC) environment as on-die transmission line connections. These high-speed data links may be configured to implement a data transfer connection between a processor, such as a central processing unit (CPU), and a memory, such as dynamic-random-access memory (DRAM). The communications link may include one or more of a cable, wires within a semiconductor package, metallization on an IC, and traces on a PCB or chip carrier.

In some instances, data may be encoded on the communications link using multi-level signaling, such that multiple bits of data or control information may be transmitted in a single pulse or communications clock cycle. Pulse-amplitude-modulation (PAM) signaling may be used in high-speed data links requiring a fixed resistance termination (e.g., resistance at the characteristic impedance of a transmission line associated with high-speed data transfers). For example, PAM signaling may be employed to connect memory such as double-data-rate synchronous-dynamic-random-access-memory (DDR SDRAM) and other devices or circuits. Other DRAM standards-based applications include double-data-rate-3 (DDR3), and low-power double-data-rate-4 (LP-DDR4). Examples of PAM include 2-level PAM (PAM-2), 4-level PAM (PAM-4) and 8-level PAM (PAM-8), where the number of levels indicates the number of voltage or current levels available for encoding data or control information.

PAM signaling provides an increase in data rate for the same bandwidth and same pulse rate. For example, PAM-4 signaling provides 4 voltage levels per pulse and the four levels can encode two binary bits of data into a single pulse. By encoding data transmissions to PAM-4 signaling, the same bandwidth and same pulse rate can double the data rate compared to a two-level pulse. This also offers a reduced pin count compared to the one pin-per-bit per communication channel approach of most inter-device communications.

Figure 2:
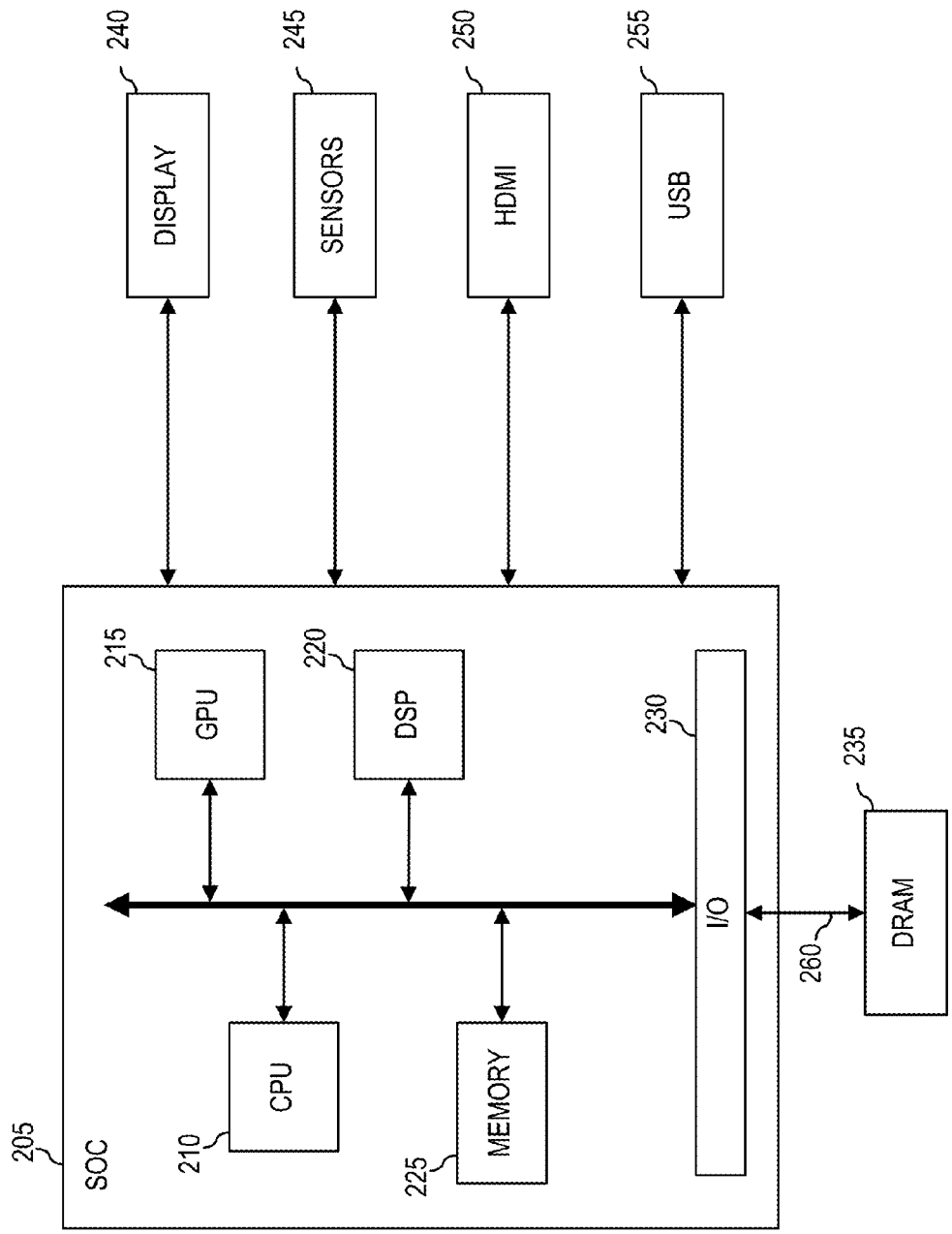
FIG. 2 illustrates a simplified system architecture of an apparatus employing a data link between SoC devices, as may be used in some example embodiments.

FIG. 2 illustrates a simplified system architecture of an apparatus employing a data link 200 between SoC devices, as may be used in some example embodiments. Mobile devices, such as smart phones, may need to operate with constrained amounts of resources to limit costs, fit within size and form-factor constraints, and be competitive in the marketplace. For example, a smart phone may include an SoC 205 that includes a central processing unit (CPU) 210, a graphics processing unit (GPU) 215, a digital signal processing unit (DSP) 220, on-chip memory (MEMORY) 225, input/output connections (I/O) 230, and off-chip dynamic-random-access memory (DRAM) 235. The SoC 205 may also connect to a display (DISPLAY) 240, sensors (SENSORS) 245, a high-definition multimedia interface (HDMI) 250, and universal-serial-Bus connections (USB) 255. The CPU 210, GPU 215, and DSP 220 may be fabricated on a single die and the DRAM 235 may be fabricated on a separate die. Data Bus widths and control signals may determine the number of interconnection paths between the processor die and the memory die. Due to the limited resources and size limitations of the device itself, routing data signals through an interconnection substrate, such as a printed circuit board (PCB), may place pressure on manufacturing, design, and economic competitiveness. As a result, there is motivation for multi-level signaling as implemented by pulse-amplitude-modulation (PAM). PAM signaling, which utilizes multi-level signaling to encode data, may alleviate some of the pressures on resources. This is true for resources involved in the interconnection of the processor die and the memory die through high-speed data links 260.

Figure 3:
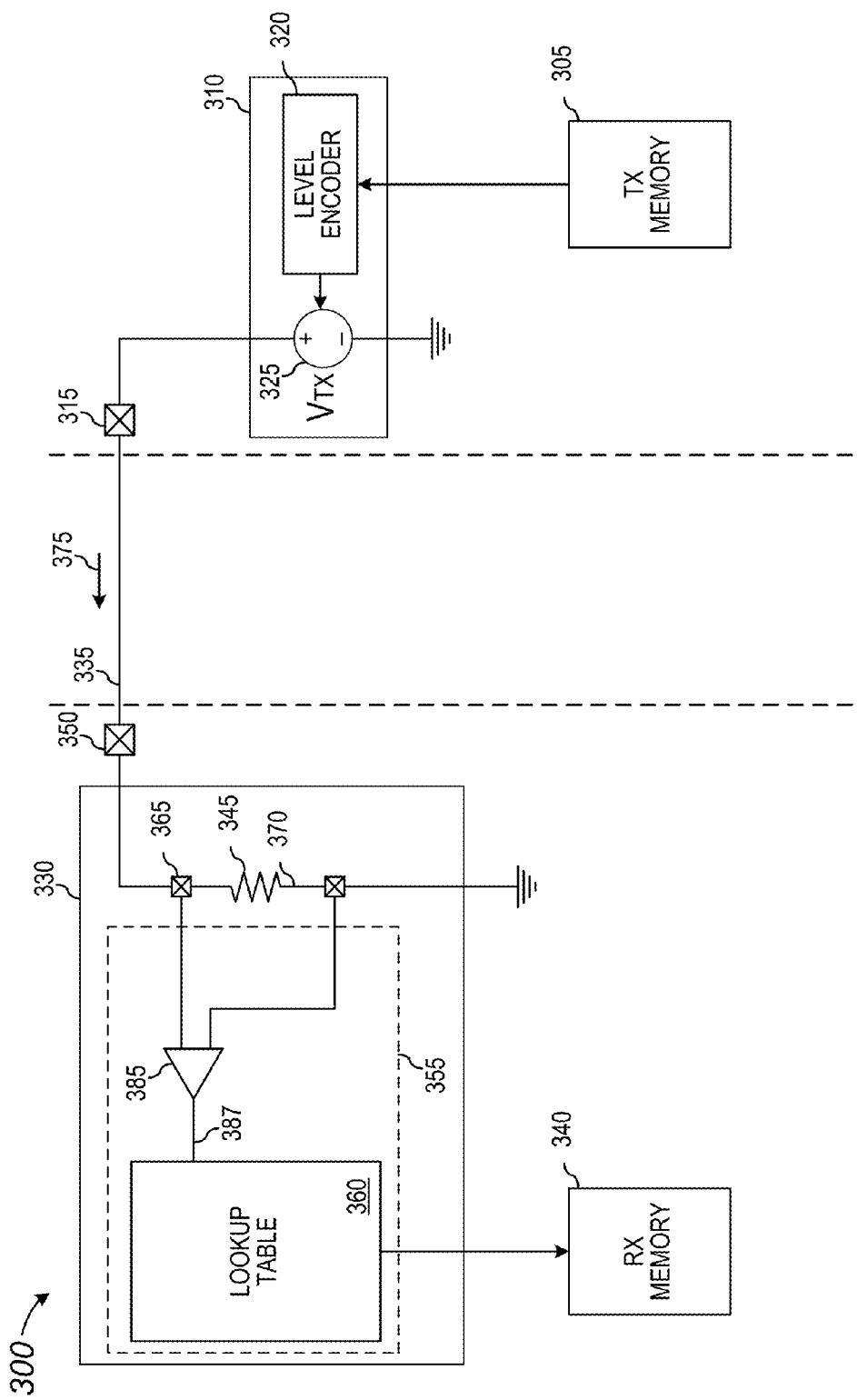
FIG. 3 is a block-level schematic diagram of a PAM-4 receiver within a PAM-signaling system.

FIG. 3 is a block-level schematic diagram of a PAM-4 receiver within a PAM-signaling system 300. The PAM-signaling system 300 includes a transmitter memory (TX MEMORY) 305 that stores and retrieves a data symbol corresponding to a message. The PAM-signaling system 300 includes a transmitter 310 connected to the transmitter memory 305 and a transmitter-side data-link terminal 315. The transmitter 310 includes a multi-level encoder (LEVEL ENCODER) 320 that is connected to the transmitter memory 305. The multi-level encoder 320 retrieves a data symbol from the transmitter memory 305 and encodes the retrieved data symbol to a multi-level transmission symbol. The transmitter 310 transmits the encoded multi-level transmission symbol according to a multi-level signaling protocol. The transmitter 310 includes a multi-level source 325 connected between the transmitter-side data-link terminal 315 and Ground. The multi-level source 325 produces a multi-level source voltage ($V_{TX}$) corresponding to multi-level signaling determined by the multi-level encoder 320. A data link 335 (alternately 'communications link') is connected to the transmitter 310 through the transmitter-side data-link terminal 315 and propagates the multi-level signaling.

The PAM-signaling system 300 includes a multi-level receiver 330 that is connected to the transmitter 310 through the data link 335 and receives the multi-level transmission symbol according to the multi-level signaling protocol. A receiver memory (RX MEMORY) 340 is connected to the multi-level receiver 330 and stores data symbols corresponding to the message. The multi-level receiver 330 includes a termination resistor 345 connected through a first termination-resistor node 365 to a receiver-side data-link terminal 350 and through a second termination-resistor node 370 to Ground. The termination resistor 345 receives multi-level signaling and generates corresponding voltages and currents across the first termination-resistor node 365 and the second termination-resistor node 370 of the termination resistor 345 according to an amplitude of the received multi-level signaling. More specifically, the termination resistor 345 receives a plurality of voltage levels and generates the corresponding voltages and currents according to respective input voltage levels formed across the termination resistor 345 by the multi-level signaling. The multi-level signaling includes the transmission symbols.

The termination resistor 345 sinks a multi-level-signal current 375. The multi-level-signal current ($I_{VTX}$) 375 is propagated through the data link 335 from the transmitter-side data-link terminal 315 to the receiver-side data-link terminal 350 for multi-level-signal pulses with a voltage magnitude greater than 0V. The multi-level-signal current 375 flows from the transmitter 310 to the multi-level receiver 330 for $V_{TX}$>0V.

A multi-level decoder 355 is connected across the termination resistor 345 by input nodes and through an output node to the receiver memory 340. The multi-level decoder 355 can include a level decoder 385. The level decoder 385 is connected across the termination resistor 345 by input nodes and through an output node to an index port 387. The level decoder 385 determines respective index entries according to voltages across the termination resistor 345. The level decoder 385 determines a voltage magnitude across the termination resistor 345 during receipt of the multi-level signaling. Each voltage magnitude determines an index entry.

A lookup table (Lookup Table) 360 is connected to the index port 387 and includes an array of data symbols and a corresponding index (not shown). The lookup table 360 receives an index entry and retrieves a data symbol from the array of data symbols corresponding to the index entry. The lookup table index is configured to uniquely associate the index entry with the data symbol from the array of data symbols. The multi-level receiver 330 may be coupled to the receiver memory 340. The receiver memory 340 may be communicatively coupled to the lookup table 360 and store data symbols corresponding to the multi-level signaling.

Figure 4:
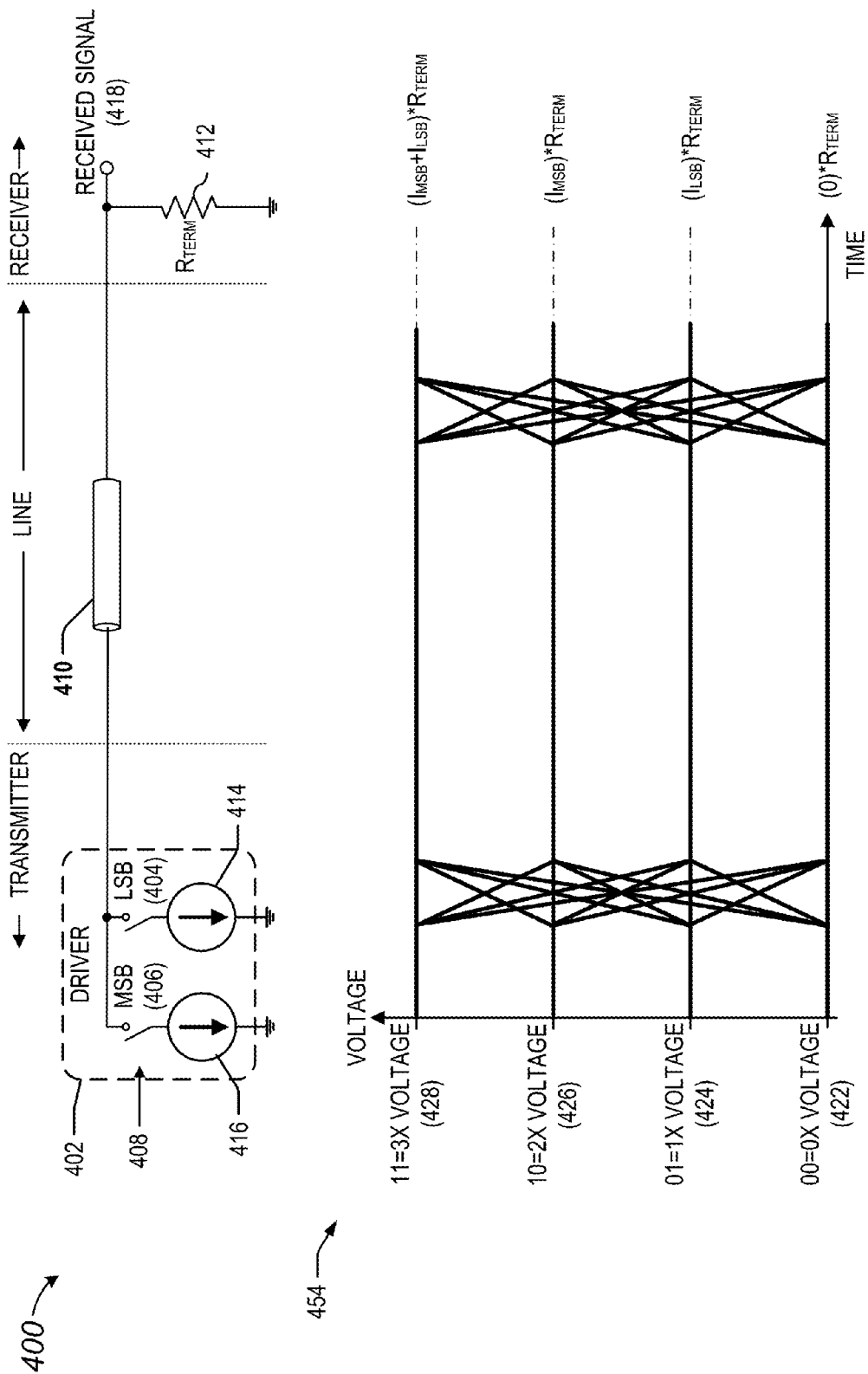
FIG. 4 illustrates multi-level signaling as used in communications across a communications link.

FIG. 4 illustrates multi-level signaling as used in communications across the data link 335. A model circuit 400 includes a multi-level line driver 402 and an encoding process 454 illustrating four voltage states 422, 424, 426 and 428 available for encoding data in one corresponding multi-level data encoding scheme. According to certain aspects disclosed herein, an encoding scheme may be employed with multi-level data encoding. A transmitter-side line driver 402 may be adapted to drive a transmission line 410 in a terminated, multi-level PAM-4 communications link. The driver circuit 402 may be controlled by an encoder (e.g. multi-level encoder 320 of FIG. 3) to produce each of four voltage states 422, 424, 426 and 428 through the configuration of a pair of switches 408.

Data may be encoded in two bits, each bit controlling the state of one of the two switches 404, 406. In one example, each switch 404, 406 may be in an open state when its control bit is set to logic "1" and in a closed state when its control bit is set to logic '0'. In another example, each switch 404, 406 may be in a closed state when its control bit is set to logic "1" and in an open state when its control bit is set to logic '0'. In the closed state, each switch 404, 406 enables current from an associated current source 414, 416 to flow through the transmission line 410 and termination resistor ($R_{TERM}$) 412. A first current source 414 produces less current than a second current source 416. One switch 406 may be controlled by the primary bit, or most-significant bit (MSB), because it causes a greater current level to flow (from the second current source 416) through the transmission line 410 when closed than the current level caused when the other secondary bit, or least-significant bit (LSB), switch 404 is closed. Current flow in the transmission line 410 and termination resistor 412 determines the voltage level of the received signal 418 at a receiver.

In the example depicted, the first current source 414 may source or sink a unit of current when connected to a load impedance while the second current source 416 sources or sinks two units of current when connected to the load impedance. The amperage corresponding to the unit of current may be determined by the application. The switches 408 may select between four current levels, including 0 units, 1 unit, 2 units, and 3 units. For the purposes of this description, the first current source 414 may be used to encode a secondary bit of a multi-bit data symbol, while the second current source 416 may be used to encode the primary bit of the multi-bit data symbol. In some instances, the voltage differences or current levels in a multi-level signal may not be uniform. In other words, the current sources may not be binary weighted or exact multiples of one another.

The load impedance may include the combined resistance of the transmission line 410 and the termination resistor 412, where the termination resistor 412 may include a resistor connected at the receiving end of a wire that may conduct current provided by the first current source 414 and the second current source 416. The voltage ($V_{out}$) of an output signal at the receiver may be determined as the product of the current ($I_{state}$) flowing in the terminating resistor and the resistance ($R_{TERM}$) of the terminating resistor. While the use of two current sources of unequal magnitude is expected to be the most common embodiment of current-based PAM-4 signaling, it is also possible to generate and transmit the four distinct current magnitudes with three distinct current sources and their corresponding on/off switches. With all three currents disabled, the resulting voltage level across the termination resistor 412 would be zero. Then, enabling only one current source at a time, three additional voltage levels could be generated across the termination resistor 412 by transmitting three distinct current magnitudes.

It will be appreciated that, in a PAM-4 configuration, a communications link consumes different amounts of power at each signal level 422, 424, 426 and 428. In a simple case where the termination resistor 412 dissipates all or substantially all of the current generated by the driver circuit 402, the power for each state may be calculated as $(I_{state})^2 \times (R_{term})$. Nominally, no power is consumed for zero-state 2-bit data symbols and power consumed by the communications link increases with current flow because the currents associated with the primary bit and the secondary bit of the 2-bit data symbol are summed across the termination resistor 412 to produce the appropriate signal level. Accordingly, significantly greater power reductions may be obtained from inverting the primary bit of the 2-bit data symbol than the secondary bit of the 2-bit data symbol.

A data symbol may be provided from the transmitter memory 305 to the multi-level encoder 320. The data symbol may be encoded into a transmission symbol having one of several possible amplitudes or voltage levels. This encoding process 454 may be known as pulse-amplitude-modulation (PAM) signaling. The data symbol may include two or more bits of information. When the data symbol includes two bits, the encoding process may produce the transmission symbol as one of four amplitudes, where each one of the amplitudes corresponds to one of the four possible states of the two bit combination of the data symbol. For example, a first pulse may be at a 0 volts (V) amplitude (e.g., a 0×VOLTAGE) and correspond to a "0,0" state of the corresponding data symbol. The remaining pulse amplitudes may be generated as a percentage of the maximum pulse amplitude of the signaling process. A second pulse may be one-third of the maximum pulse amplitude (e.g., a 1×VOLTAGE) and correspond to a "0,1" state of the data symbol and a third pulse may be two-thirds of the maximum pulse amplitude (e.g., a 2×VOLTAGE) and correspond to a "1,0" state of the data symbol. The fourth pulse may be generated as the maximum pulse amplitude of the signaling process (e.g., a 3×VOLTAGE) and correspond to a "1,1" state of the data symbol. Each data symbol maps to one transmission symbol in the encoding process. Accordingly, encoding is the mapping of data symbols to transmission symbols, where the transmission symbols may be equivalently identified by any of a pulse amplitude, a voltage level, or a signaling level.

Decoding the transmission symbols is the complement of the encoding process. Each pulse corresponding to a transmission symbol has a corresponding pulse amplitude determined and used to index a particular data symbol. For instance, the index corresponding to the pulse amplitude of the transmission symbol being decoded, may be used to access an entry in a lookup table. A given pulse amplitude has a signaling level that will correspond to one index entry and allow access to one data symbol contained in an array of data symbols within the lookup table. The pulse amplitude of a given transmission symbol may correspond to a voltage level, that when applied to a determination device, produces a corresponding electrical characteristics such as a voltage and/or a current, where the voltage may have a polarity and the current a current flow direction through the termination device.

However, the termination resistor 345 in the multi-level receiver 330 consumes power according to the transmission symbol amplitude (voltage level) being decoded. The amount of power dissipated in decoding PAM signaling in the multi-level receiver 330 is significant and creates an impact to the resource budget in a typical SOC design. A way is needed to conduct PAM signaling according to standard transmitter and transmission line conventions, yet be able to configure the receiver to accept standard PAM signaling levels with reduced amounts of current being drawn through the termination resistor 345 per pulse.

Figure 5:
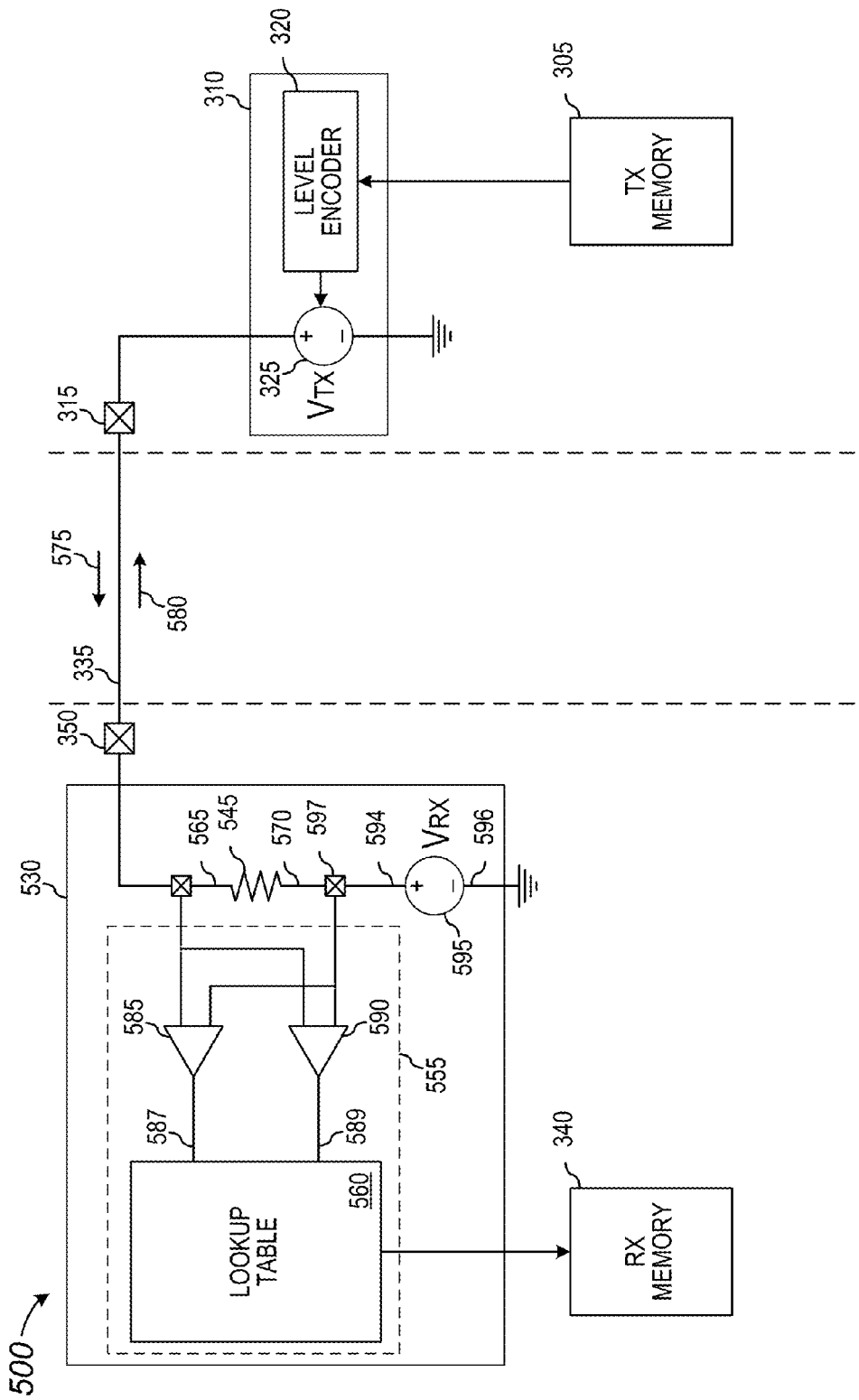
FIG. 5 is a block-level schematic diagram of a raised-floor system including PAM-4 raised-floor biasing, as may be used in certain exemplary embodiments.

FIG. 5 is a block-level schematic diagram of a raised-floor system 500 including PAM-4 raised-floor biasing, as may be used in certain exemplary embodiments. In a fashion similar to that described above in regard to FIG. 3, the raised-floor system 500 includes the transmitter memory 305, the transmitter 310 connected to the transmitter memory 305 and the transmitter-side data-link terminal 315. Similarly, the transmitter 310 includes the multi-level source 325 and the multi-level encoder 320, which retrieves a data symbol from the transmitter memory 305 and encodes the retrieved data symbol to a multi-level transmission symbol as described above. A particular set of data symbols may constitute a message. Within the context of a message, data symbols and message symbols may be used and referred to interchangeably. The transmitter 310 transmits the same multi-level transmission symbol according to a multi-level signaling protocol. The data link 335 is connected and operates as described above.

The raised-floor system 500 may include a raised-floor receiver 530 that is connected to the transmitter 310 through the data link 335 and receives the multi-level transmission symbol according to the multi-level signaling protocol. A multi-level termination resistor 545 may be communicatively coupled through a first termination-resistor node 565 to the receiver-side data-link terminal 350 and through a second termination-resistor node 570 to a biasing terminal 597. The multi-level termination resistor 545 is configured to receive multi-level signaling and generate corresponding polarized voltages and currents across the first termination-resistor node 565 and the second termination-resistor node 570 of the multi-level termination resistor 545 according to the amplitude of the received multi-level signaling. According to some example embodiments, the multi-level termination resistor 545 is configured to receive a plurality of voltage levels and generate the corresponding polarized voltages and currents according to respective input voltage levels formed across the multi-level termination resistor 545 by the combination of the multi-level signaling and a biasing-voltage level ($V_{RX}$). The multi-level signaling includes transmission symbols encoded from data symbols. A biasing source 595 is communicatively coupled through a first biasing-source node 594 to the biasing terminal 597 and through a second biasing-source node 596 to Ground and is configured to selectively generate the biasing-voltage level $V_{RX}$ on the biasing terminal 597.

A multi-level decoder 555 may be coupled by input nodes across the multi-level termination resistor 545 and by an output node to the receiver memory 340. The multi-level decoder 555 is configured to determine respective entries of a set of compound-index entries according to the polarized voltages across and current directions through the termination resistor. The multi-level decoder 555 may include a level decoder 585 that is communicatively coupled by input nodes across the multi-level termination resistor 545 and by an output node to a first index port 587. The level decoder 585 is configured to determine a first portion of respective entries of a set of compound-index entries. The level decoder 585 is configured to determine a voltage magnitude across the multi-level termination resistor 545 during receipt of the multi-level signaling. Each voltage magnitude determines the first portion of the respective entry in the set of compound-index entries.

The multi-level decoder 555 may also include a current sensor 590 that is communicatively coupled by input nodes across the multi-level termination resistor 545 and by an output node to a second index port 589. The current sensor 590 is configured to determine a second portion of the respective entries in the set of compound-index entries. The current sensor 590 is configured to determine a direction of current flowing through the multi-level termination resistor 545 by measuring a polarity of the voltage across the termination resistor during receipt of the multi-level signaling. A given polarity of voltage, due to a multi-level signaling pulse, across the multi-level termination resistor 545 will induce current flow with a direction corresponding to the polarity of the voltage.

In the raised-floor system 500, the multi-level source 325 and the biasing source 595 can source and sink current during the course of multi-level signaling. The biasing-voltage level $V_{RX}$ generated by the biasing source 595 on the biasing terminal 597 remains constant during a transmission session and corresponds to a particular combination of lookup table index and lookup table 360 (discussed below). The multi-level source voltage $V_{TX}$ varies according to transmission symbol generation by the multi-level source 325 during multi-level signaling. The multi-level source 325 sinks current during a 0-level signal transmission. The 0-level signal transmission causes a reversal of the current flow through the multi-level termination resistor 545 and the current sensor 590 produces a current-sense indication ($I_{Sense}$) as an output signal that is a logic "1" or "0," depending on the polarity of voltage across and the current direction through, the multi-level termination resistor 545.

A high-multi-level-signal current ($I_{VTXH}$) 575 is propagated through the data link 335 from the transmitter-side data-link terminal 315 to the receiver-side data-link terminal 350 for multi-level-signal pulses with a voltage magnitude greater than 0V. The high-multi-level-signal current 575 flows from the transmitter 310 to the raised-floor receiver 530 for $V_{RX} < V_{TX}$. In a similar sense, but complementary nature, a low-multi-level-signal current ($I_{VTXL}$) 580 is propagated through the data link 335 from the receiver-side data-link terminal 350 to the transmitter-side data-link terminal 315 for multi-level-signal pulses with a voltage magnitude less than 0V. The low-multi-level-signal current 580 flows from the raised-floor receiver 530 to the transmitter 310 for $V_{RX} > V_{TX}$.

A lookup table (Lookup Table) 560 may be communicatively coupled to the first index port 587 and the second index port 589 and includes an array of data symbols and a corresponding lookup table index (not shown). The lookup table 560 is configured to receive one in the set of compound-index entries and retrieve a data symbol from the array of data symbols corresponding to a respective entry in the set of compound-index entries. The lookup table index is configured to uniquely associate the first portion and the second portion of one in the set of compound-index entries with the message symbol from the array of message symbols. In the present exemplary embodiment, a message symbol and a data symbol may be equivalent. However, as discussed below, a message symbol may be further encoded and be considered an inverted-data symbol in certain encoding schemes. In relation to the raised-floor system 500, data symbols and message symbols may be considered to be the same.

The lookup table index of the raised-floor system 500 differs from the lookup table index in the lookup table 360 of the multi-level receiver 330 of the PAM-signaling system 300 (FIG. 3). In the multi-level receiver 330, the multi-level decoder 355 connects to the termination resistor 345 and according to the voltage levels produced by the multi-level signaling propagated through the data link 335, the multi-level decoder 355 decodes one of four index entries. Each of the four index entries corresponds to one of the voltage levels appearing on the termination resistor 345 by a corresponding one of the multi-level signals. The multi-level signaling produces one of the four signaling levels at a maximum-amplitude-signal level. The remaining three of the four signaling levels may be referred to as respective fractions of the maximum-amplitude-signal level. Each one of the multi-level signaling levels produces a corresponding voltage level across the termination resistor 345 and the multi-level decoder 355 produces a corresponding one of the four index entries. In the multi-level receiver 330, each of the voltage levels across the termination resistor 345 is a positive voltage or 0V and is referenced to Ground. The four index entries are provided by the multi-level decoder 355 to the lookup table 360 through the index port 387. The lookup table index of the lookup table 360 accesses one of four message symbols in a message symbol array within the lookup table 360 according to the four index entries from the multi-level decoder 355.

In the multi-level decoder 555 of the raised-floor receiver 530, the level decoder 585 and the current sensor 590 work in tandem to measure voltage levels produced by the same multi-level signaling as described above in relation to the multi-level receiver 330. Since the multi-level termination resistor 545 of the raised-floor receiver 530 has the voltage at the second termination-resistor node 570 offset from Ground by the biasing-voltage level $V_{RX}$ on the biasing terminal 597, the same multi-level signaling described above in the PAM-signaling system 300 produces a different set of voltages levels and current directions for each respective multi-signaling level than experienced by the termination resistor 345 in the multi-level receiver 330.

In the raised-floor system 500, compound-index entries are utilized to access message symbols and the level decoder 585 determines the first portion of respective entries in the set of compound-index entries (described above) and the current sensor 590 determines the second portion of respective entries in the set of compound-index entries. The level decoder 585 determines voltage magnitudes corresponding to each one of the multi-level signaling levels in a fashion similar to that described above in relation to the multi-level decoder 355 of the multi-level receiver 330. However, due to the biasing-voltage level $V_{RX}$ applied to the multi-level termination resistor 545, certain of the voltage magnitudes determined by the level decoder 585 may duplicate one another in magnitude, yet differ in polarity, and correspondingly, the direction of current produced through the multi-level termination resistor 545. Various levels of the biasing-voltage level $V_{RX}$ applied to the multi-level termination resistor 545 may produce combinations of identical voltage amplitudes from the multi-level signaling. As long as the biasing-voltage level $V_{RX}$ remains constant and fixed to a magnitude that relates to a particular set of compound-index entries during the entirety of a communications session with the raised-floor system 500, correct access and retrieval of message symbols occurs.

The combination of voltage level and current direction produced by the multi-level signaling across the multi-level termination resistor 545 are unique for the four transmission symbols provided on the data link 335. The second portion of the compound index entry, determined by the current sensor 590 allows two equivalent magnitude voltage levels determined by the level decoder 585 to be uniquely decoded as respective entries in the set of compound-index entries. Therefore, the same multi-level signaling utilized in the multi-level receiver 330 of the PAM-signaling system 300 may be applied to the raised-floor receiver 530 of the raised-floor system 500 and according to the multi-level decoder 555 and apply respective entries in the set of compound-index entries to the lookup table index of the lookup table 560 of the raised-floor receiver 530 and access the same message symbols as would be retrieved in the PAM-signaling system 300.

The raised-floor system 500 may also include a receiver memory 340 that is communicatively coupled to the lookup table 560 and configured to store data symbols corresponding to the multi-level signaling. Message symbols or data symbols may be retrieved from the lookup table 560 of the raised-floor receiver 530 and provided to the receiver memory 340 similar to the situation (above) in the multi-level receiver 330 (FIG. 3).

By incorporating PAM-4 raised-floor biasing of about 33% of a maximum-amplitude-signaling level, the raised-floor system 500 may utilize an amount of power in decoding the transmission symbol and retrieving the corresponding data symbol from the array of data symbols that is about 57% less than an amount of power utilized in retrieving a further data symbol from the array of data symbols with a biasing-voltage level $V_{RX}$ of 0V.

Figure 6:
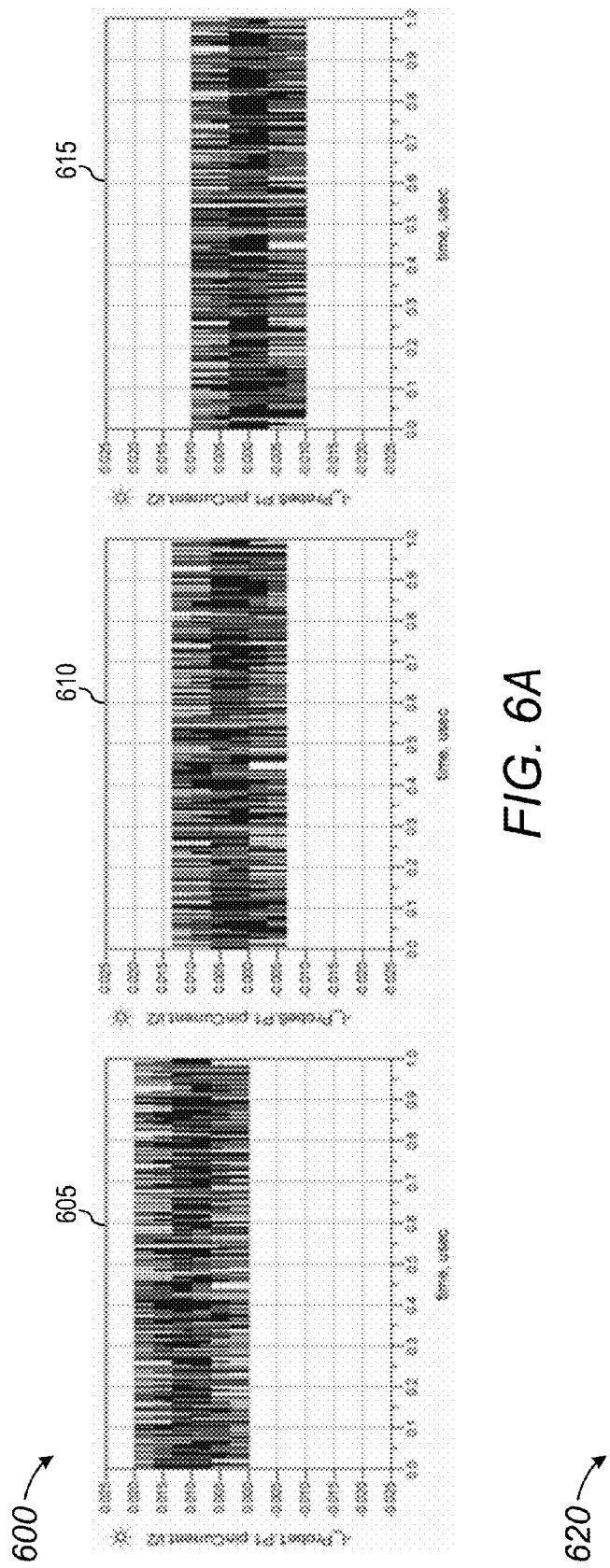
FIG. 6A is a graph of PAM-4 receiver signaling-levels with raised-floor biasing 600, according to certain exemplary embodiments.
FIG. 6B is a table of theoretical versus simulated power savings, according to certain exemplary embodiments.

FIG. 6A is a graph of PAM-4 receiver signaling-levels with raised-floor biasing 600, according to certain exemplary embodiments. As discussed above in relation to operation of the multi-level decoder 555 and the biasing provided to the biasing terminal 597 by the biasing source 595, various levels of the biasing-voltage level $V_{RX}$ may be applied to the multi-level termination resistor 545. The range of voltage magnitudes and current directions produced across the multi-level termination resistor 545 varies accordingly. The range of voltage levels produced on the data link 335 may be referred to as the "Swing" and the level or magnitude of the biasing-voltage level $V_{RX}$ may be referred to as a portion or fraction of the Swing. e.g., Swing/2 may be the term used to describe the biasing-voltage level $V_{RX}$ being set to one-half of the voltage range of the multi-level signaling on the data link 335. The setting of the biasing-voltage level $V_{RX}$ may be referred to "floor-height adjustment."

A Ground-referenced graph 605 illustrates current through the multi-level termination resistor 545 during multi-level signaling with the biasing-voltage level $V_{RX}$ being set to 0V or what may be referred to as Ground-referenced biasing. The magnitude of current through the multi-level termination resistor 545 ranges from 0.000 to +0.020 A as the multi-level signaling ranges from a level-0 (e.g., corresponding to the encoded transmission symbol 0,0) to a level-3 (e.g., corresponding to the encoded transmission symbol 1,1). A Swing/3 graph 610 illustrates current through the multi-level termination resistor 545 during multi-level signaling with the biasing-voltage level $V_{RX}$ being set to one-third of the voltage range of the multi-level signaling or Swing/3. The magnitude of current through the multi-level termination resistor 545 ranges from −0.006 to +0.014 A as the multi-level signaling ranges from level-0 to level-3. A Swing/2 graph 615 illustrates current through the multi-level termination resistor 545 during multi-level signaling with the biasing-voltage level $V_{RX}$ being set to one-half of the voltage range of the multi-level signaling or Swing/2. The magnitude of current through the multi-level termination resistor 545 ranges from −0.010 to +0.010 A as the multi-level signaling ranges from level-0 to level-3.

FIG. 6B is a table of theoretical versus simulated power savings, according to certain exemplary embodiments. In table 620 the floor-height adjustments (Termination Levels) described above (e.g., Ground-referenced, Swing/3) and their corresponding theoretical (Theoretical) and simulated (Simulated) relational values are compared. The Ground-referenced floor-height is normalized to the value "1." The power consumption for the raised-floor system 500 with the floor-height adjustment of Swing/3 is 0.429 of the normalized power (Ground-referenced) and the power consumption for the Swing/2 floor-height adjustment is 0.357 of the normalized power. The simulated values indicate a verification of the expected theoretical values.

Figure 7:
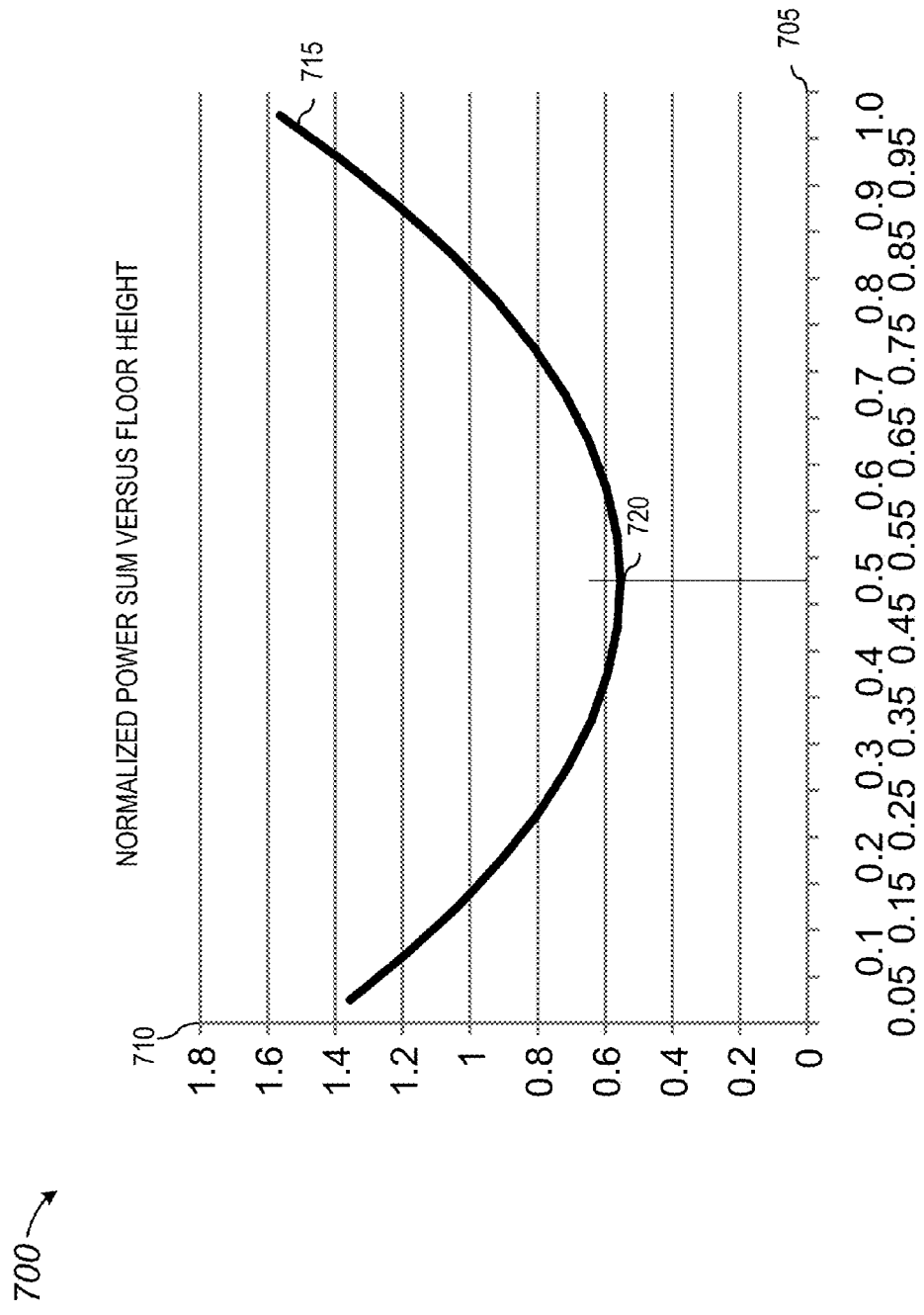
FIG. 7 is a graph of normalized power summation versus floor-height, as may be used in some exemplary embodiments.

FIG. 7 is a graph of a normalized power versus floor-height 700, as may be used in some exemplary embodiments. A normalized power 710 is graphed on the vertical axis and normalized floor-height 705 on the horizontal axis. The normalized floor-height 705 ranges from 0 to 1. Normalized power 710 ranges from 0 to 1.8. For example, the Swing/2 example, discussed above, occurs where the normalized power 715 achieves a minimum power 720. The minimum power 720 occurs at the normalized floor-height of 0.5 (i.e., at Swing/2).

The normalized power 710 curve provides a way of comparing the total signaling power consumed versus floor-height in the raised-floor receiver 530. Each value of the normalized power 710 curve is calculated from the sum of the power consumed at each of the four signal levels at the corresponding floor-height. For example, at a floor-height of zero (i.e., Ground-referenced), the normalized power value is the sum of the normalized power at each of the four signal levels from level-0 to level-3, with the biasing-voltage level $V_{RX}$ equal to 0V. To normalize the power, the power at level-3 with $V_{RX}$ equal to 0V is set to unity or 1, and the amount time communications occur at each signal level is considered to be equal. The power at a given signal level is given by the expression $I^2R$, where I is the current 575 through the multi-level termination resistor 545 and R is the value, in ohms, of the multi-level termination resistor 545.

The level-3 power is the basis of normalization, and therefore has a normalized power equal to 1. Each of the four successive power levels is separated by ⅓ of the Swing. The Swing is the range of voltage levels produced on the data link 335 which are applied across the multi-level termination resistor 545 and produce I, the current 575. The level-2 power occurs at ⅔ of the Swing voltage (i.e., IR) and therefore at the current 575 of ⅔ of I. Since the power at each level is based on the same value R of the multi-level termination resistor 545, the relative power for a given signal level is the square of the ratio of the current at the considered signal level relative to the level-3 current. The square of the ratio of the level-2 current to the level-3 current will give the level-2 normalized power summand. The level-2 current is ⅔ of the level-3 current (Ground-referenced). The level-2 power summand therefore, is (⅔)² or 0.444 .... In a similar fashion, the level-1 power summand is (⅓)² or 0.111 ..., and the level-0 power summand is 0. Therefore, the normalized power at the floor-height of $V_{RX}$ equal to 0V, is 1+0.444 ... +0.111 ... +0 or 1.555 .... The Swing/2 normalized power is the sum of the four normalized power levels at level-3 to level-0 (at the Swing/2 floor-height). The corresponding Swing/2 current ratios are +½ I, +⅙ I, −⅙ I, and −½ I. The normalized power at a floor-height of Swing/2 is therefore 2*(½)²+2*(⅙)² or 0.555 .... This is the value of the minimum power 720 discussed above. The power saving of the Swing/2 floor-height compared to the Ground-referenced floor is the Swing/2 normalized-power divided by the Ground-referenced normalized-power, or 0.555 ... /1.555 ..., which equals 0.357. This confirms the Swing/2 theoretical versus simulated power savings shown in FIG. 6B.

Figure 8:
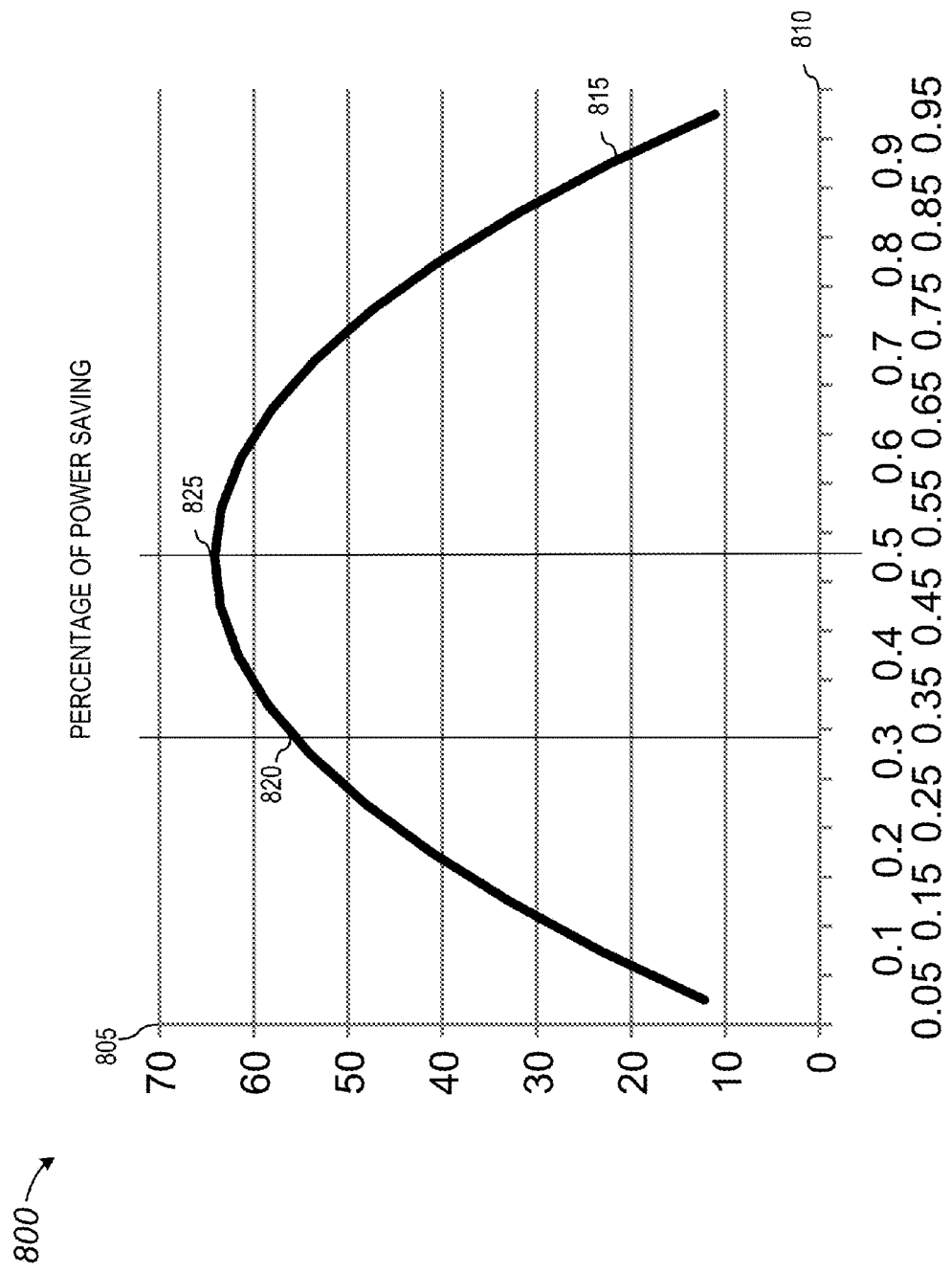
FIG. 8 is a graph of a percentage of power savings versus floor-height, according to some exemplary embodiments.

FIG. 8 is a graph of a percentage of power savings versus floor-height 800, according to some exemplary embodiments. Percentage 805 is graphed on the vertical axis and normalized floor-height 810 on the horizontal axis. Normalized floor-height 810 ranges from 0 to 1. The Swing/3 examples above, have a normalized floor-height of 0.333 ..., and the plot of percentage power savings 815 shows the Swing/3 savings 820 as about 57%. Similarly, the Swing/2 examples above have a normalized floor-height of 0.5, and the plot of percentage power savings 815 shows the Swing/2 savings 825 as about 64%. Referring to the PAM-4 receiver signaling-levels with raised-floor biasing 600 of FIG. 6B, the Swing/2 power saving is 0.357 compared to the normalized power of 1. Therefore, the power saved is the normalized power minus the used power, or 1 −0.357, or 0.643; which verifies the 64% power savings graphed in the percentage of power savings versus floor-height 800 graph.

Figure 9:
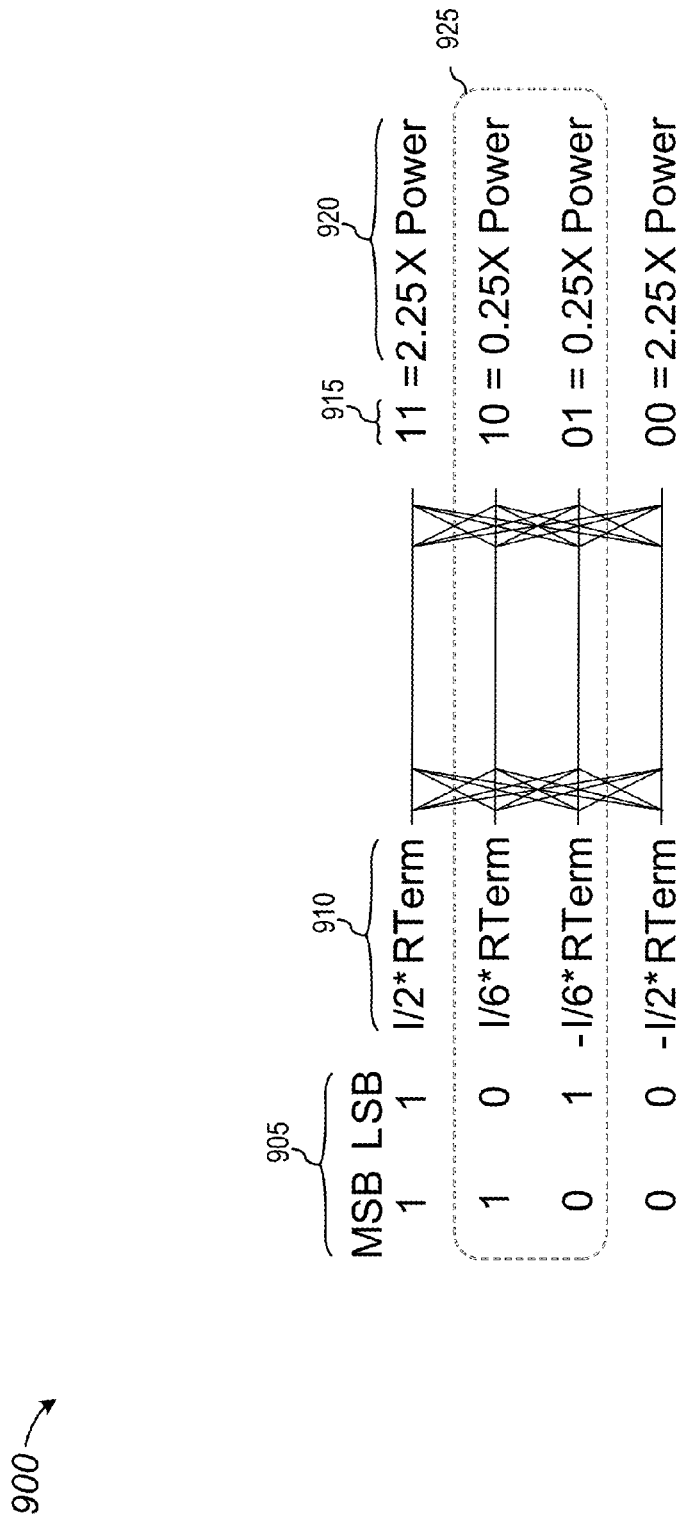
FIG. 9 is a tabular representation of a power savings benefit provided by pre-coding, as may be used in certain exemplary embodiments.

FIG. 9 is a tabular representation of a power savings benefit 900 that may be provided by pre-coding, as may be used in certain exemplary embodiments. Values of a most-significant bit (MSB) and least-significant bit (LSB) 905 of an idealized byte of a transmission symbol propagated through an exemplary embodiment of the raised-floor system 500 are charted in the left-hand portion of the graph. The MSB and LSB 905 correspond to four encoded states 915 ranging in value from 0,0 to 1,1. A set of relative current levels 910 chart a multi-level termination resistor current (I) as a fraction of a normalized current level (e.g., ½, ⅙) through the multi-level termination resistor 545 ($R_{TERM}$). For the case of the floor-height biasing being set to Swing/2, which is assumed here, the relative power levels 920 are symmetric about the midpoint with the power levels of the 0,0 and 1,1 MSB/LSB cases being equal and the 0,1 and 1,0 MSB/LSB cases also being equal. A minimum power grouping 925, indicates that the minimum power utilized in simple transmission, and therefore the greatest power savings, occurs when the MSB and LSB are different from one another. The minimum power grouping 925 indicates the benefit that may be gained by pre-coding algorithms that may shift portions of bits within a particular partition of a given data symbol to be transmitted as a transmission symbol including inverted bits and decoded in the multi-level decoder 555 of the raised-floor receiver 530.

Pre-coding may be a term referring to a type of Data-Bus-Inversion (DBI) that may reduce power consumption in signaling transitions by application of algorithms to invert certain data bits in a message symbol prior to transmission. However, this type of pre-coding utilizes an additional communication channel to communicate the inversion information between and encoder and a decoder to synchronize the inversion processes at each end of the transmission so that the original data symbols may be reconstituted at the receiver.

Figure 10:
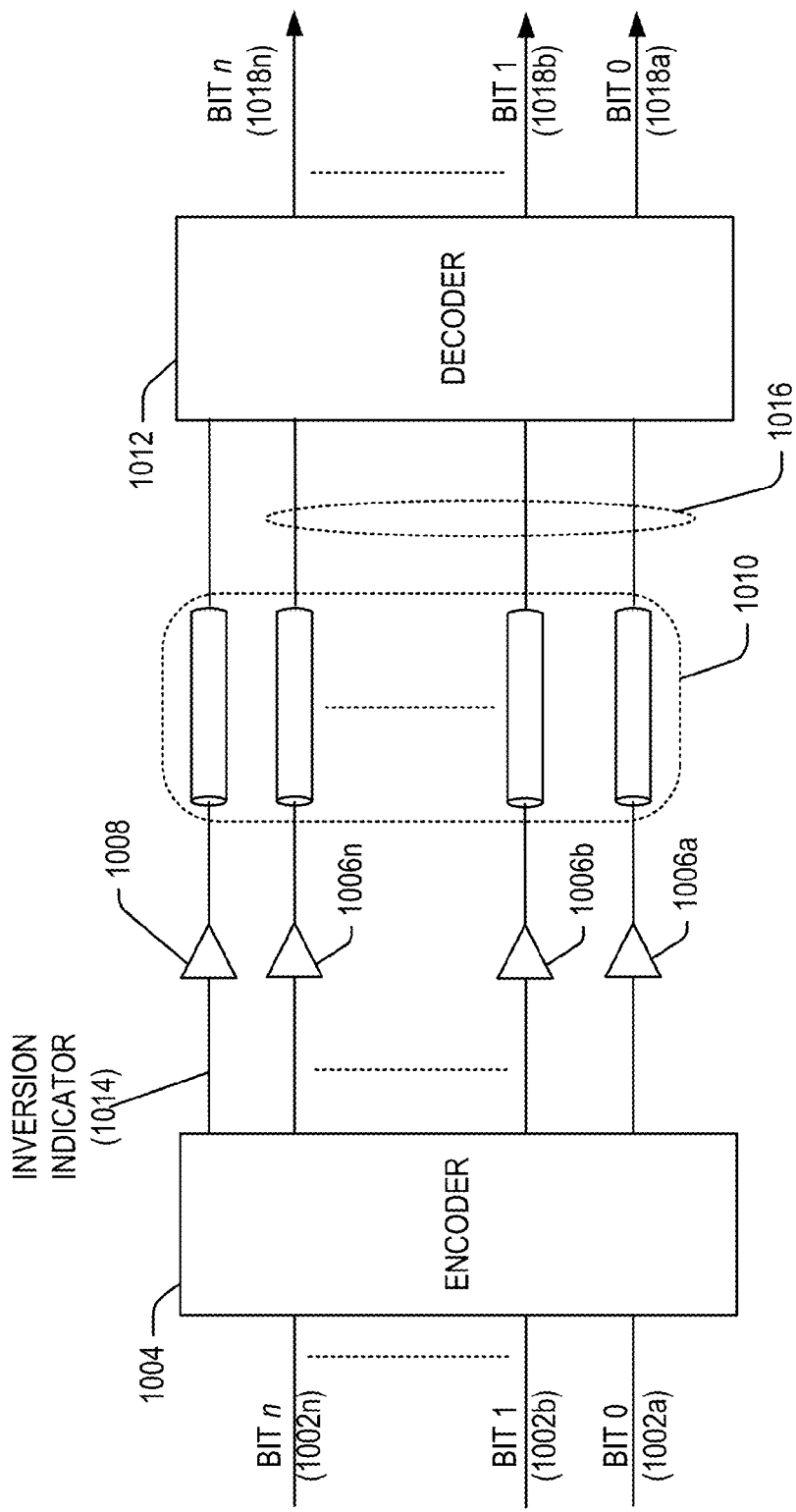
FIG. 10 is a block-level schematic drawing illustrating a Data-Bus-Inversion encoding/decoding system.

FIG. 10 is a block-level schematic drawing illustrating a Data-Bus-Inversion (DBI) encoding/decoding system. The Data-Bus-Inversion encoding/decoding system may be used in conjunction with various power-reducing algorithms and further hardware within a communication system, to selectively invert bits within bytes or portions of bytes to reduce power consumed in transmitting message symbols. The reduction in transmission power may be accomplished by modifying the number of "1s" or "0s" that would otherwise occur within the transmitted message symbol.

The encoder 1004 may be configured to monitor n-bit parallel input data 1002a-1002n. The encoder 1004 may invert the parallel input data 1002a-1002n, or certain portions, prior to transmission when some portion of the byte to be transmitted has data bits (1002a-1002n) with an undesired value. The undesired value may be a value that causes greater current flow than other values. For example, the undesired value in each data bit of parallel input data 1002a-1002n may be logic "0" if the logic "0" causes current to flow and logic "1" does not cause current flow. The undesired value in each considered data bit of parallel input data 1002a-1002n may be a logic "1" in the bit position if the logic "1" causes current to flow and logic "0" does not cause current flow.

An inversion-indicator node 1014 may transmit an inversion indicator, or "data-inversion indicator," to the decoder 1012 using a line driver 1008 to drive one connector of the Bus 1010. The inversion-indicator transmitted by the inversion-indicator node 1014 may indicate when parallel data transmitted through line drivers 1006a-1006n and the Bus 1010 to the decoder 1012 includes one or more data elements that have been inverted by the encoder 1004. The decoder 1012 may respond to the inversion indicator by re-inverting any inverted data elements received from the Bus 1010. In one example, the inversion-indicator node 1014 may be associated with parallel input data 1002a-1002n that has an 8-bit width and the inversion-indicator node 1014 is set when a most-significant portion, or most-significant byte (4-bit byte), of the transmission data (e.g., BIT_8-BIT_5) has been inverted according to a pre-coding algorithm. It is noted that the term Byte is often associated with a group of 8 bits. In this context, and throughout the documentation and associated claims, the terminology is applied more generally to refer to a group of a pre-determined number of bits. In a similar way, the term Word is applied to a group of bits generally larger in number than a Byte, but not necessarily equal to 16, which is the commonly associated quantity.

The encoder 1004 may be configured to invert the parallel input data 1002e-1002n (where n=8) and the decoder 1012 may be configured to invert the most-significant (4-bit) byte of the data 1016 received from the Bus 1010 when the inversion-indicator node 1014 is asserted (e.g., set="1"). The decoder 1012 reverses any inversion performed by the encoder 1004 and thereby produces an output 1018a-1018n that is a true copy and/or representation of the parallel input data 1002a-1002n of the encoder 1004. In some examples, the determination of whether the encoder 1004 should invert the parallel input data 1002a-1002n or a portion thereof, may include a consideration of one or more other bytes, or portions of those bytes, in a 16, 32 or 64 bit word that are transmitted in parallel with the parallel input data 1002a-1002n of the encoder 1004. In some instances, the Bus width may be as narrow as two parallel bits or signal lines.

Figure 11:
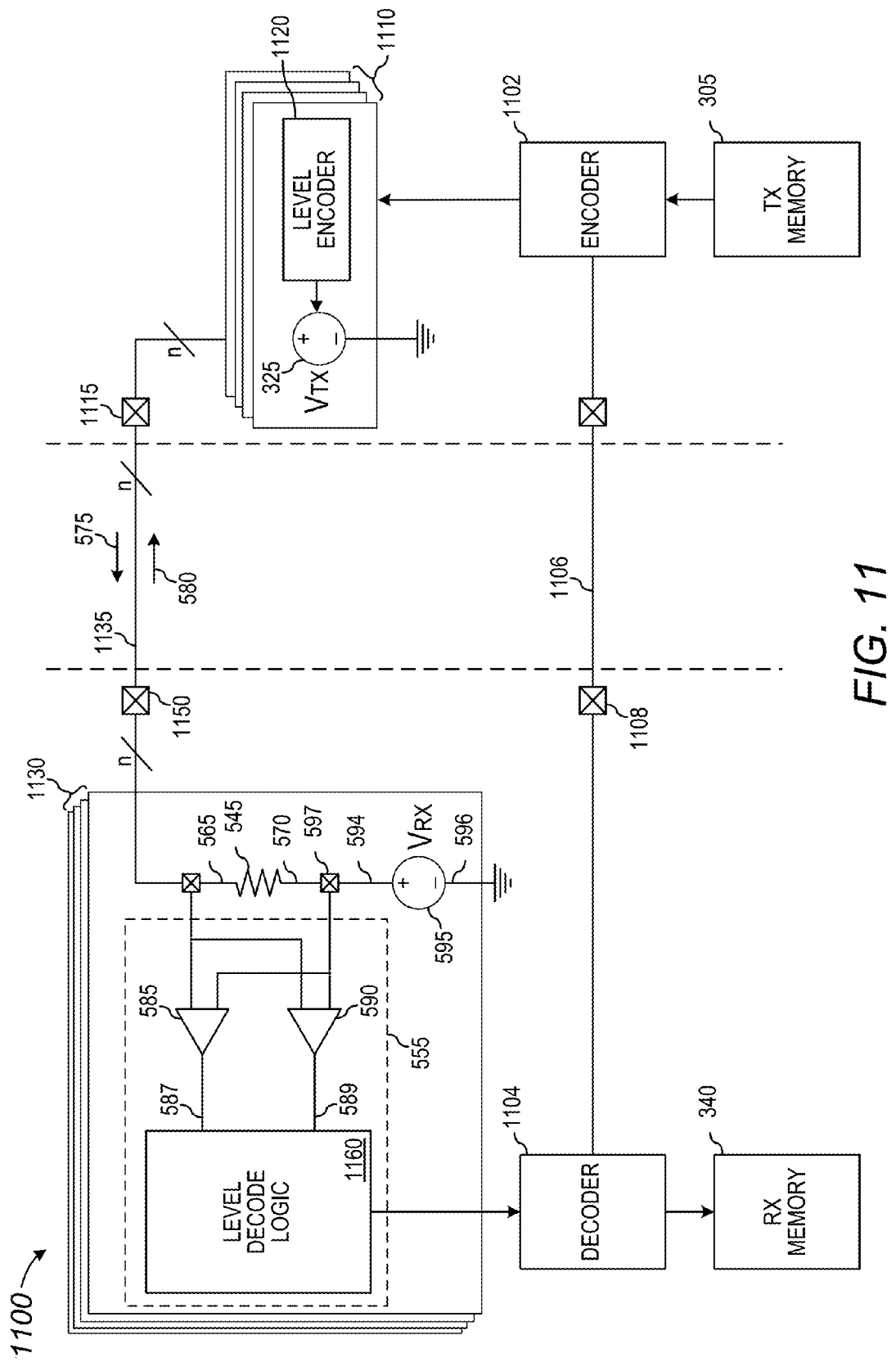
FIG. 11 is a block-level schematic diagram of a raised-floor system incorporating raised-floor biasing and multi-level signaling with data-inversion pre-coding.

FIG. 11 is a block-level schematic diagram of a raised-floor system 1100 incorporating raised-floor biasing and multi-level signaling with data-inversion pre-coding, according to certain exemplary embodiments. The raised-floor system 1100 includes a transmitter memory 305 (FIG. 3) that in some exemplary embodiments may be configured to store and retrieve a data symbol corresponding to a message. The raised-floor system 1100 may include a plurality of transmitters 1110 each having a respective multi-level encoders (LEVEL ENCODER) 1120 coupled to a transmitter-side data-link terminal 1115. The multi-level encoders 1120 and the transmitter-side data-link terminal 1115 may generally correspond to the multi-level encoder 320 and the transmitter-side data-link terminal 315 described above in relation to FIG. 3. The multi-level encoders 1120 and the transmitter-side data-link terminal 1115 may be configured in some exemplary embodiments to be accompanied by instances of these elements in parallel. For example, the multi-level encoders 1120 may be implemented on a circuit board and be configured to operate in parallel with further multi-level encoders 1120 implemented on further parallel circuit boards.

The number of transmitters in the plurality of transmitters 1110 and the width of the transmitter-side data-link terminal 1115 correspond with the number of bits in the Bus-structure (i.e., Word-width) implemented with the raised-floor system 1100. Each of the multi-level encoders 1120 may be communicatively coupled to the transmitter memory 305 and be configured collectively with remaining multi-level encoders 1120 to retrieve a data symbol from the transmitter memory 305 and encode a data symbol to a multi-level transmission symbol. An inverted-data encoder (ENCODER) 1102 may be communicatively coupled between the transmitter memory 305 and the plurality of transmitters 1110 and respective ones of the multi-level encoders 1120, according to some exemplary embodiments. The inverted-data encoder 1102 is configured to pre-code a data symbol to an inverted-data symbol in a fashion similar to that described above in relation to the Data-Bus-Inversion encoding/decoding system of FIG. 10.

The plurality of transmitters 1110 may be configured to transmit the encoded multi-level transmission symbol according to a multi-level signaling protocol. A communications link or data link 1135 may be communicatively coupled to the plurality of transmitters 1110 through the transmitter-side data-link terminal 1115 and be configured to propagate multi-level signaling. The data link 1135 may include a number "n" of bit lines that correspond with the Bus width of the raised-floor system 1100. The raised-floor system 1100 includes a plurality of raised-floor receivers 1130 that may be communicatively coupled to the plurality of transmitters 1110 through the data link 1135 and may be configured to receive the multi-level transmission symbol according to the multi-level signaling protocol. A receiver memory 340 may be communicatively coupled to the raised-floor receivers 1130 and be configured to store data symbols corresponding to the message. The raised-floor receivers 1130, according to some exemplary embodiments, may be configured to operate in parallel and in combination when coupled to the receiver memory 340. The raised-floor receivers 1130 may generally correspond with the raided-floor receiver 530 described above in relation to FIG. 5. An inverted-data decoder (DECODER) 1104 may be communicatively coupled between the raised-floor receivers 1130 and the receiver memory 340 and be configured to decode the inverted-data symbol (retrieved from respective instances of level decode logic 1160 described below) to the data symbol.

The respective raised-floor receivers 1130 each include a multi-level termination resistor 545 communicatively coupled through the first termination-resistor node 565 to a receiver-side data-link terminal 1150 and through the second termination-resistor node 570 to the biasing terminal 597. The receiver-side data-link terminal 1150 may include a number "n" of bit positions that correspond with the bus width of the raised-floor system 1100 and correspond with the width of the data link 1135. Each multi-level termination resistor 545 is configured to receive multi-level signaling and generate corresponding polarized voltages and currents across the first termination-resistor node 565 and the second termination-resistor node 570 of the multi-level termination resistor 545. The multi-level signaling includes transmission symbols, at least a portion of which are inverted-data symbols encoded from data symbols. The biasing source 595 is communicatively coupled through a first biasing-source node 594 to the biasing terminal 597 and through a second biasing-source node 596 to Ground and is configured to selectively generate a biasing-voltage level $V_{RX}$ on the biasing terminal 597.

The level decoder 585 and the current sensor 590 are each communicatively coupled through input nodes across the multi-level termination resistor 545 and through an output node to the first index port 587 and the second index port 589 respectively. The level decoder 585 is configured to determine a first portion, and the current sensor to determine a second portion of respective entries of a set of compound-index entries. Level decode logic 1160 is communicatively coupled to the first index port 587, the second index port 589, and the inverted-data decoder 1104, and may, in some exemplary embodiments, include an array of combinatorial logic and a corresponding data symbol index (not shown). The level decode logic 1160 may be configured to decode a data symbol from an array of data symbols upon receipt of a corresponding one in the set of compound-index entries. The level decode logic 1160 may be implemented in some embodiments as an array of combinatorial logic and be configured to receive the first portion and the second portion of the respective entries from the set of compound-index entries and apply each entry to the index to retrieve an associated message symbol from the array of transmission symbols.

The raised-floor system 1100 also includes an inversion-indicator node 1106 that is communicatively coupled through an indication terminal 1108 to the inverted-data decoder 1104. The inversion-indicator node 1106 propagates an inversion indicator (not shown), which may also be known as an inversion flag, to the inverted-data decoder 1104. The inverted-data decoder 1104 may be communicatively coupled to the level decode logic 1160 and the inversion-indicator node 1106. The inverted-data decoder 1104 is configured to decode inverse-data symbols to data symbols. A receiver memory 340 may be communicatively coupled to the inverted-data decoder 1104 and is configured to store data symbols corresponding to the multi-level signaling.

By using the raised-floor receivers 1130 in conjunction with the biasing source 595, an amount of power utilized in decoding the transmission symbol and retrieving the data symbol from the array of data symbols, when using a biasing-voltage level $V_{RX}$ from the biasing source 595 of about one-half or 50% of a maximum-amplitude-signaling level, is about 64% less than an amount of power utilized in retrieving a further data symbol from the array of data symbols with a biasing-voltage level $V_{RX}$ of 0V. By incorporating the inverted-data encoder 1102 and inverted-data decoder 1104 to pre-code data symbols to inverse-data symbols before transmission, an amount of power utilized in producing the decoded pre-coded data symbol from the decoder, according to a biasing-voltage level $V_{RX}$ of about 50% of a maximum-amplitude-signaling level, is about 71% less than an amount of power utilized in retrieving a further data symbol from the array of data symbols with a further biasing-voltage level $V_{RX}$ of 0V.

Figure 12:
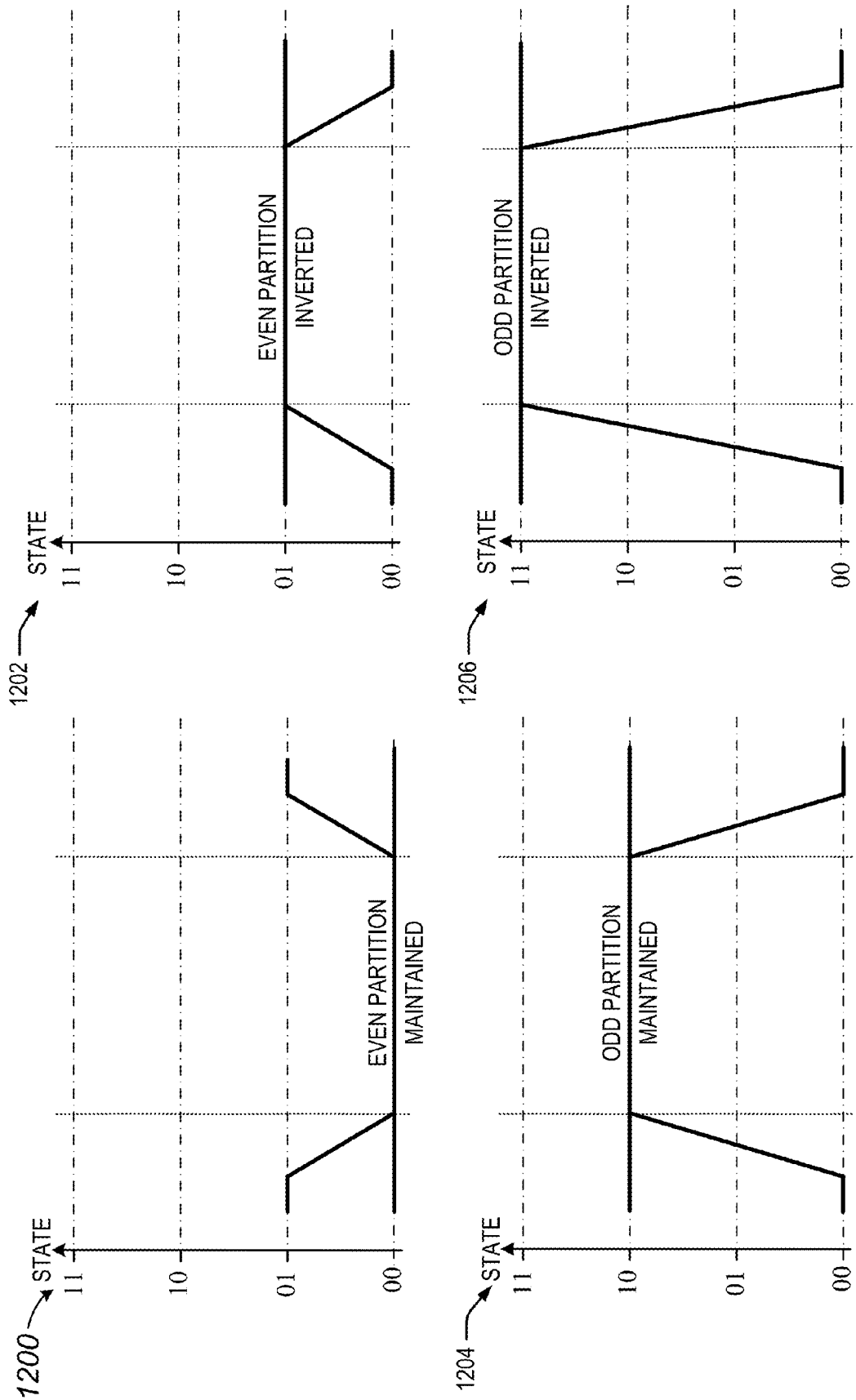
FIG. 12 is a graphical representation of a multi-level data-inversion indicator, according to certain aspects disclosed herein.

FIG. 12 is a graphical representation of a multi-level data-inversion indicator, according to certain aspects disclosed herein. A data-inversion indicator or "inversion indication" may be a multi-level encoded indicator signal. For example, an inversion indication may be encoded into four voltage states 1200, 1202, 1204, and 1206, as illustrated in FIG. 12. The data-inversion indicator or inversion indication may be transmitted as a signal, such as an inversion-indicator signal. According to some data pre-coding algorithms, the four voltage states 1200, 1202, 1204, and 1206 may encode a partition selector and an inversion designator, each having two states, where the partition selector indicates a selection of one of two possible partitions ("even" or "odd") and the inversion designator indicates whether the selected partition is inverted or maintained (i.e., not inverted). The transmitted inversion-indicator signal may be in a '00' voltage state 1200 when an even partition is maintained, in a '01' voltage state 1202 when the even partition is inverted, in the '10' voltage state 1204 when an odd partition is maintained, and in the '11' voltage state 1206 when the odd partition is inverted. When the transmitted inversion-indicator signal is transmitted through the inversion-indicator node 1106 to the indication terminal 1108 (FIG. 11), the inverted-data decoder 1104 is provided with a voltage level corresponding to one of the four voltage states 1200, 1202, 1204, and 1206. Logic within the inverted-data decoder 1104 is able to decode the one of the four voltage states 1200, 1202, 1204, and 1206 and determine which partition, odd or even, is selected, and to be inverted or maintained.

Figure 13:
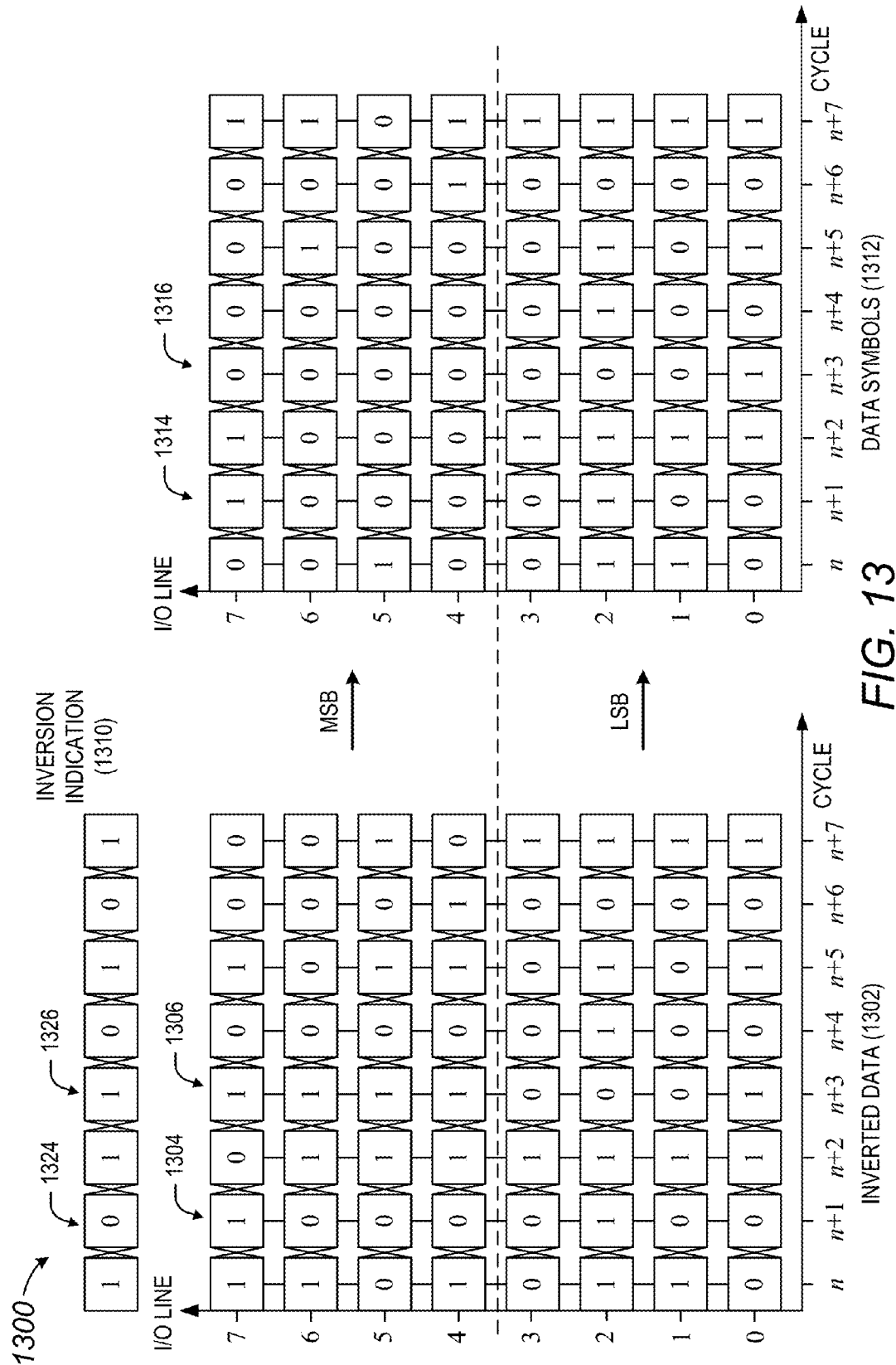
FIG. 13 is a timing diagram of decoding a pre-coded multi-level inverted-data stream, according to some disclosed exemplary embodiments.

FIG. 13 is a timing diagram of decoding a pre-coded multi-level inverted-data stream 1300, according to some exemplary embodiments. The graph relates to an example in which a sequence of eight words is transmitted in a sequence of clock cycles, numbered n through n+7. The eight words are received by the decoder 1012 as conditionally-inverted-data symbols (INVERTED DATA) 1302 retrieved from the level decode logic 1160 after transmission over the data link 1135 as encoded transmission symbols. Each byte includes eight bits, numbered 0-7 across an I/O line (I/O LINE) in the timing diagram of decoding a pre-coded multi-level inverted-data stream 1300. The encoder 1004 may examine each byte to determine whether an inversion should be performed for the most-significant byte (MSB) of each word in the sequence.

In the example, a sequence of inversion indications (INVERSION INDICATION) 1310 associated with each of the inverted-data symbols 1302 progress in sequence according to clock cycles n–n+7. For instance, at clock cycle n+1 in the sequence of the inversion indications 1310, a second inversion indication 1324, is associated with a second inverted-data symbol 1304 in the inverted-data symbols 1302. The inversion indications 1310 may, for example, represent the inversion designator portion of a decoded inversion indication signal as discussed above in relation to FIG. 12. The inversion indications 1310 may, in further exemplary embodiments, represent an inversion indication directly available in a non-encoded form and in immediate association with an inverted-data symbol. In either of these exemplary cases, the inversion indications 1310 may have been propagated from the inverted-data encoder 1102, through the inversion-indicator node 1106 and the indication terminal 1108, to the inverted-data decoder 1104 (FIG. 11).

The second inversion indication 1324 is a logic "0," or non-asserted indication, meaning that the associated second inverted-data symbol 1304 is not to be inverted. This may be the situation when the associated pre-coding algorithm has determined that the original data symbol would not have provided a power-savings benefit if it would have had its MSB inverted before transmission. Accordingly, at clock cycle n+1 in the sequence of data symbols (DATA SYMBOLS) 1312, the second data symbol 1314 does not have its MSB inverted and is equivalent to the second inverted-data symbol 1304.

In further example, at clock cycle n+3 in the sequence of the inversion indications 1310, a fourth inversion indication 1326, is associated with a fourth inverted-data symbol 1306 in the inverted-data symbols 1302. The fourth inversion indication 1326 is logic "1" or an asserted indication, meaning that the associated fourth inverted-data symbol 1306 is to be inverted in order to reconstitute the original fourth data symbol. This may be the situation when the associated pre-coding algorithm has determined that the original data symbol would have provided a power-savings benefit if it would have had its MSB inverted before transmission. Accordingly, at clock cycle n+3 in the sequence of data symbols (DATA SYMBOLS) 1312, the fourth data symbol 1316 has its MSB inverted. Bits 4-7 of the fourth inverted-data symbol 1306 are inverted to become bits 4-7 of the fourth data symbol 1316.

According to certain types of pre-coding as exemplified by the two example situations given here, a power savings similar to that alluded to in the tabular representation of power savings benefit 900 (FIG. 9) may be realized. The inverted-data encoder 1102 and the inverted-data decoder 1104 of the raised-floor system 1100 incorporating raised-floor biasing and multi-level signaling with data-inversion pre-coding (FIG. 11), may be used to implement the inversion of the MSB as presented in the two examples above.

A BUS structure used in a PAM data link may be partitioned into distinct portions, e.g., most-significant byte (MSB) and least-significant byte (LSB). In a first algorithm (Algorithm 1), pre-coding may include the analysis of the number of bit pairs at corresponding bit positions within the MSB and the LSB that differ from one another in a given transmission cycle. For instance, the minimum power grouping 925 (FIG. 9) indicates how the most-significant bit and least-significant bit differ from one another to produce a low power level during symbol transmission. This difference may be computed through the logical exclusive-OR operation of the MSB/LSB bit pairs. The bits considered in the respective bit pairs range from the most significant bit position to the least significant bit position-across each respective partition (most significant bit in MSB compared to most significant bit in LSB summed down to the least significant bit in the MSB compared with the least significant bit in the LSB). If the sum of the number of differing bit pairs is less than the number that is half the count of bits in the width of the partition, the algorithm flips all the bits in the MSB and sends a separate flag indicating the flip (i.e., the inversion indications 1310, FIG. 13). This algorithmic approach to flipping a portion of the bits in a particular cycle of the transmission to the mid-referenced average power region (i.e., the minimum power grouping 925).

In a further algorithm (Algorithm 2), a similar analysis of the number of bit pairs at corresponding bit positions within the MSB and the LSB may be initiated. However a given data symbol may be partitioned into four portions where the least-significant half (i.e., lowest-order two portions) of the data symbol is referred to as an even byte and further partitioned into an MSB and LSB. Similarly, the most-significant half (i.e., highest-order two portions) of the data symbol is referred to as an odd byte and further partitioned into an MSB and LSB. In Algorithm 2, the same algorithm as described above in Algorithm 1, is applied to the most-significant half and the least-significant half of the data symbol where the comparison is made to determine if the number of differing bits is less than the Bus width ($W_{BUS}$)/4. If this inequality is true, the most-significant half of the data symbol is inverted and an encoded inversion indication is set to "0." If this inequality is not true, the next step is to determine if the number of differing bits is $<(W_{BUS})*3/4$. A next step is to determine if the number of differing bits in the MSB and LSB of the even byte is greater than the number of differing bits in the MSB and the LSB of the odd byte. If this inequality is true, then the MSB of the odd byte is inverted and an encoded inversion indication is set to "1." If this inequality is not true, then the MSB of the even byte is inverted and the encoded inversion indication is set to "2." If the last combination of inequalities is not true, the even MSB partition is maintained and the encoded inversion indication is set to "3."

Figure 14:
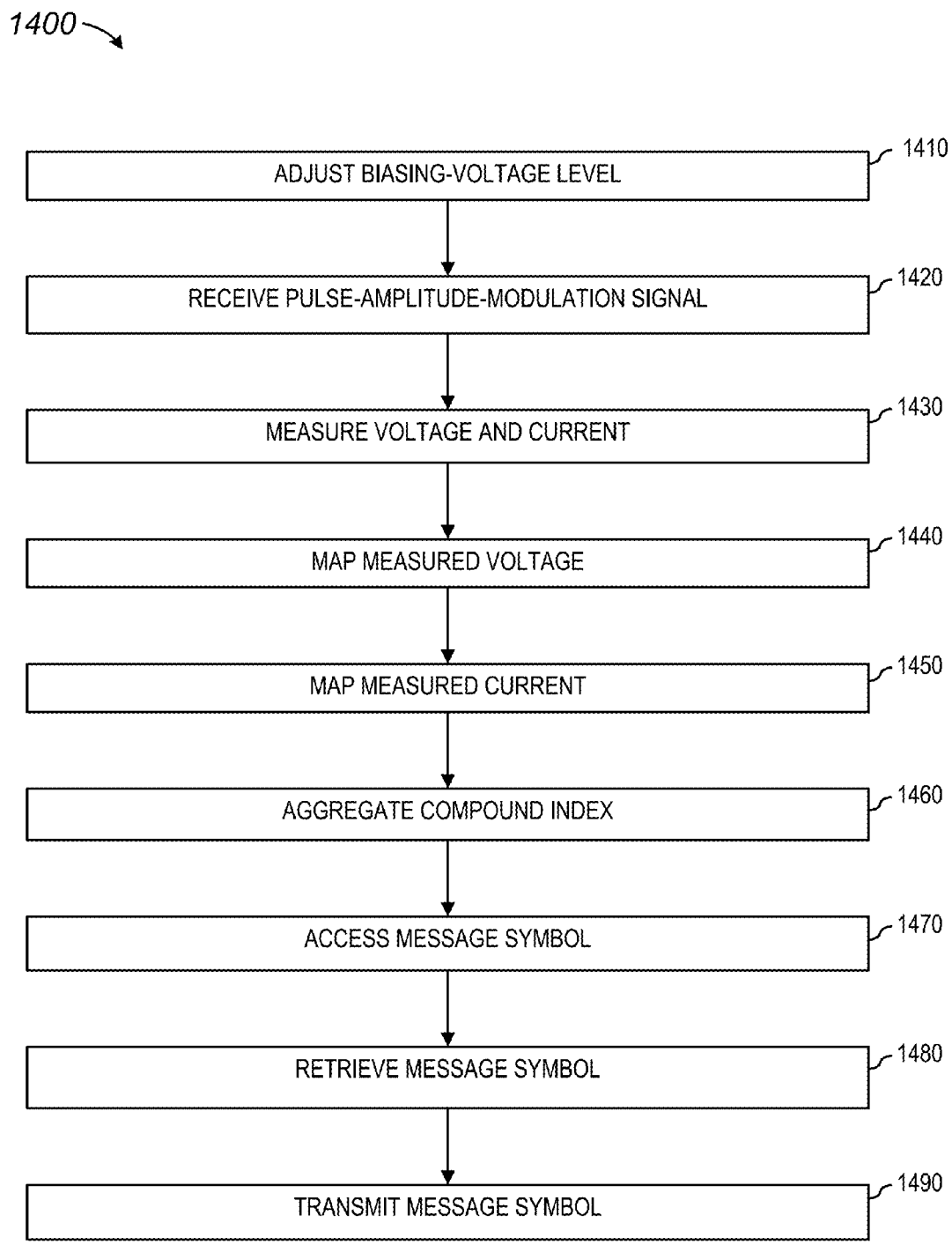
FIG. 14 is a flowchart illustrating a method of decoding pre-encoded multi-level-data symbols, according to one aspect disclosed herein.

FIG. 14 is a flowchart illustrating a method of decoding pre-encoded multi-level-data symbols, according to one aspect disclosed herein. The method commences with selectively adjusting 1410 a biasing-voltage level $V_{RX}$ being applied to a multi-level termination resistor 545. Biasing-voltage levels may be between about 50% (one-half) and 33% (one-third) of the maximum-amplitude-signaling level applied to the data link 1135. The multi-level termination resistor 545 is communicatively coupled to a receiver-side data-link terminal 350 of the raised-floor receiver 530 and to a biasing terminal 597. The method continues with receiving 1420 a pulse-amplitude-modulation signal through the data-link terminal (e.g., data link 1135), across the multi-level termination resistor 545, and through the biasing terminal 597. According to the pulse-amplitude-modulation signal, measuring 1430 a voltage level across, and a current amplitude through the multi-level termination resistor 545. The method also includes the step of mapping 1440 the measured voltage level to a multi-level signaling amplitude and mapping 1450 the measured current amplitude through the multi-level termination resistor 545 to a current direction indicator. According to the mapping of the measured voltage level and the current amplitude through the multi-level termination resistor 545, according to a further exemplary embodiment the method proceeds with aggregating 1460 the compound index including the multi-level signaling amplitude and the measured current direction indicator.

Once the compound index as aggregated, the method continues by selectively accessing 1470 a message symbol in a message symbol array within a lookup table 560 according to the compound index. The method progresses by retrieving 1480 the message symbol from the lookup table 560 according to the compound-index access. The method concludes with transmitting 1490 the retrieved message symbol to a receiver memory.

Figure 15A:
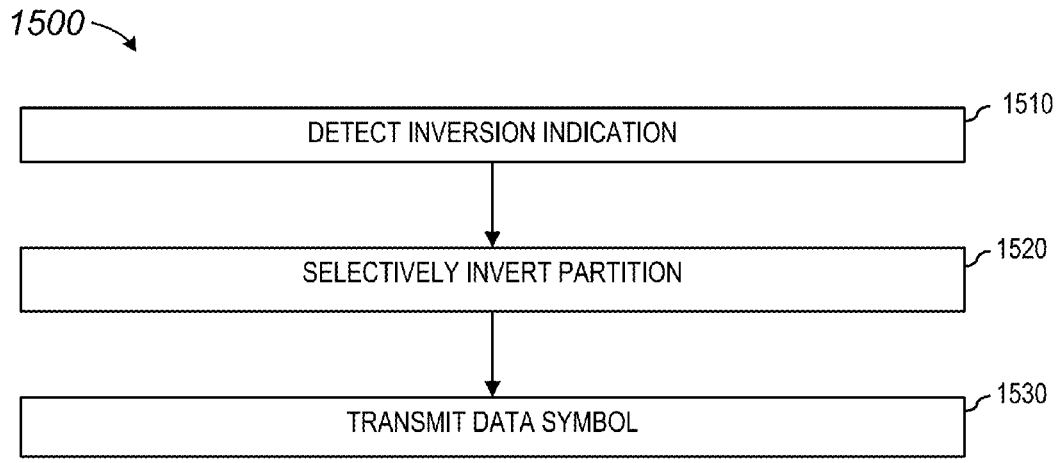
FIG. 15A is a flowchart illustrating a method of decoding pre-encoded multi-level inverse-data symbols, as practiced in certain exemplary embodiments.

FIG. 15A is a flowchart illustrating a method of decoding of pre-encoded multi-level inverse-data symbols 1500, according to a further disclosed exemplary embodiment. When the message symbol is an inverted-data symbol, the method of FIG. 14 further includes detecting 1510 an inversion indication associated with the inverted-data symbol, the inversion indication is associated with a partition of bits within the inverted-data symbol. The inversion indication is a binary bit situated within the inverted-data symbol at a bit location separate from a data-designating partition. The inversion indication signifies that a most-significant partition 1399 of the inverted-data symbol is inverted according to an encoding process and the inverted partition is specified within the encoding process. According to the inversion indication, the method continues with selectively inverting 1520 the partition of bits within the inverted-data symbol to produce a data symbol. The method concludes with transmitting 1530 the data symbol to a receiver memory 340.

Figure 15B:
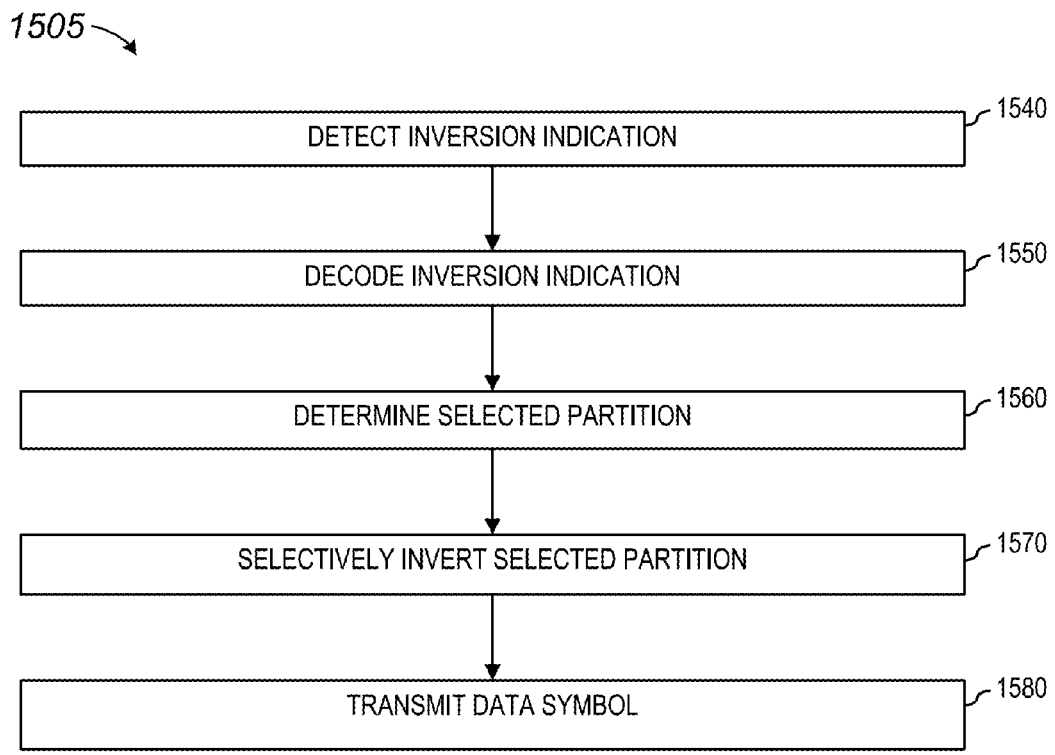
FIG. 15B is a flowchart illustrating a method of decoding pre-encoded multi-level inverse-data symbols, according to further disclosed exemplary embodiments.

FIG. 15B is a flowchart illustrating a method of decoding of pre-encoded multi-level inverse-data symbols 1505, according to further disclosed exemplary embodiments. When the message symbol is an inverted-data symbol, the method of FIG. 14 further includes detecting 1540 an inversion indication associated with the inverted-data symbol. The inversion indication is a multi-level-inversion symbol encoded to include an ordered pair of binary bits, the ordered pair including a first bit corresponding to the partition selector and a second bit corresponding to the inversion designator. According to some exemplary embodiments, the inversion indication is a multi-level-inversion symbol including four signal levels, each signal level corresponding to an encoding of an inversion-specification state determined by the ordered pair. In further exemplary embodiments, the inversion indication is a multi-level-inversion symbol including four signal levels encoded into an ordered pair. A first bit of the ordered pair determines a selected partition to be an odd partition when asserted (e.g., "1") and an even partition otherwise (e.g., "0"). A second bit of the ordered pair determines that the selected partition is inverted when asserted (e.g., "1") and maintained otherwise (e.g., "0").

The method continues with decoding 1550 the inversion indication into a partition selector and an inversion designator. The decoding 1550 includes decoding the inversion indication into an ordered pair of binary bits including a first bit corresponding to the partition selector and a second bit corresponding to the inversion designator. The method includes determining 1560 a selected partition according to the partition selector, wherein an odd partition is selected when the partition selector is asserted, otherwise an even partition is determined to be selected. A next step of the method is selectively inverting bits 1570 within the selected partition according to the inversion designator. Bits within the selected partition are inverted when the inversion designator is asserted, otherwise bits within the selected partition are maintained. The method concludes with transmitting 1580 the data symbol to the receiver memory 340.

Figure 16:
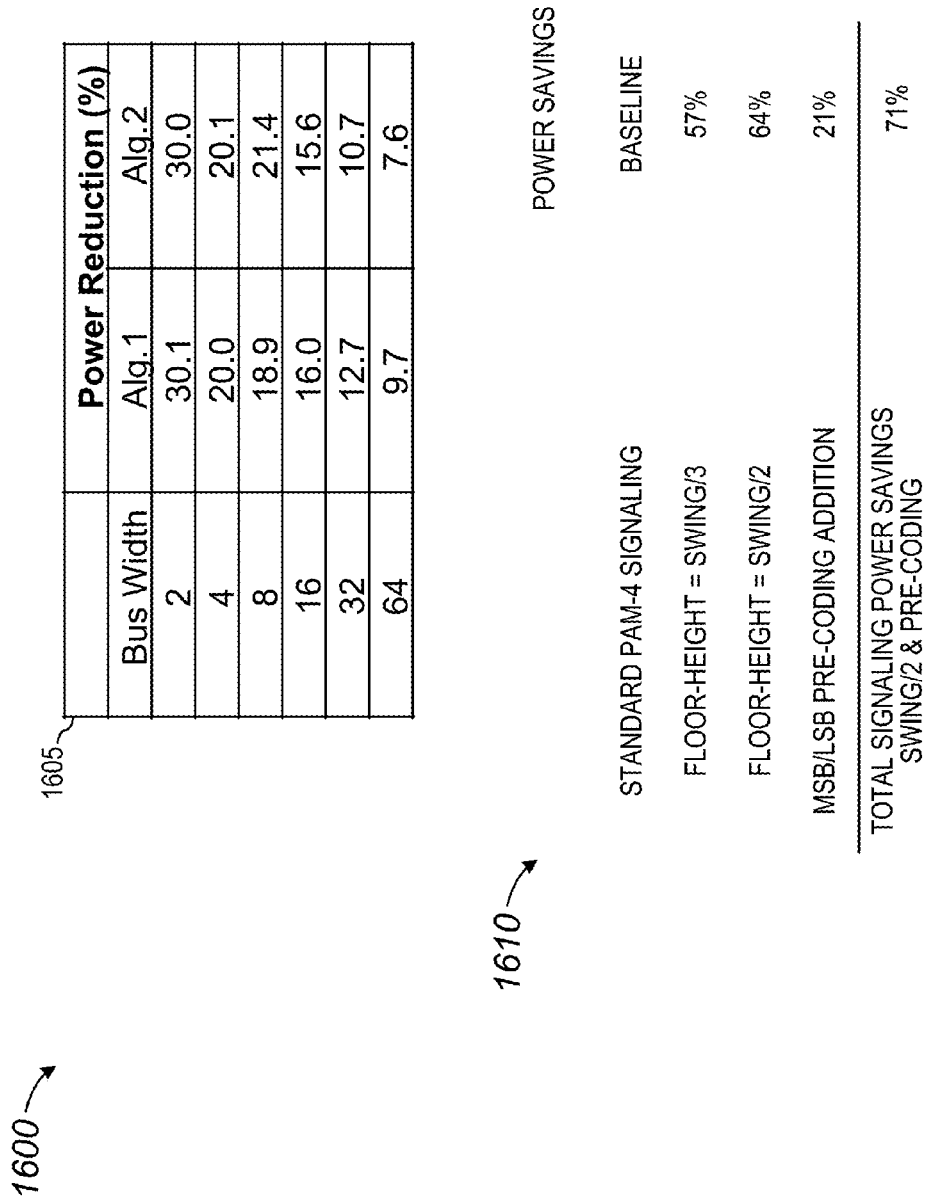
FIG. 16 is a chart comparing power reduction by Bus width according to the pre-coding algorithms and data-link power reduction, according to various embodiments disclosed herein.

FIG. 16 is a chart comparing power reduction by Bus width according to pre-coding algorithms being applied with data-link power reduction, according to various embodiments disclosed herein.

Additional power savings are realized by applying the pre-coding of data prior to transmission in addition to "raising the floor" as described above. A Bus structure used in a PAM data link is partitioned into distinct portions, e.g., most-significant byte (MSB) and least-significant byte (LSB). Algorithm 1 and Algorithm 2 as described above (FIG. 13) may be applied to data symbols in various Bus-width situations. For example Bus widths from 2-64 may be considered for the application of these two exemplary algorithms (Algorithm 2 may not make particular sense with a Bus width of 2). A power reduction chart (Power Reduction %) 1605 delineates the percentage of power reduction according to Algorithm 1 (Alg. 1) and Algorithm 2 (Alg. 2) versus Bus width (Bus Width). Algorithm 1 is maximal at smaller Bus widths and Algorithm 2 continues that same trend except with a relative peak at a Bus width of eight bits.

A power saving summary 1610 charts the various floor-height adjustments described above according to various exemplary embodiments. Commencing with standard PAM-4 signaling as a baseline, a next power savings entry indicates a floor-height=Swing/3 providing a power savings of 57%, followed by a floor-height=Swing/2 providing a power savings of 64%. A next entry indicates that the MSB/LSB pre-coding provides an additional power savings of 21% when concatenated with either of the prior floor-height adjustment approaches. The total signal power savings provided by a floor-height=Swing/2 with the addition of MSB/LSB pre-coding providing a 71% power savings. This level of power savings may be realized by the application of the exemplary embodiments described above in relation to the raised-floor system 1100 incorporating raised-floor biasing and multi-level signaling with data-inversion pre-coding (FIG. 11), where the data-inversion pre-coding is practiced according to Algorithm 2 (FIG. 13), and the graphical representation of decoding a pre-coded multi-level inverted data stream 1300 (FIG. 13) as may be applied to An eight-bit Bus.

Those of skill in the art will appreciate that the various illustrative blocks and modules described in connection with the embodiments disclosed herein can be implemented in various forms. Some blocks and modules have been described above generally in terms of their functionality. How such functionality is implemented depends upon the design constraints imposed on an overall system. Skilled persons can implement the described functionality in varying ways for each particular application, but such implementation decisions should not be interpreted as causing a departure from the scope of the invention. In addition, the grouping of functions within a module, block, or step is for ease of description. Specific functions or steps can be moved from one module or block without departing from the invention.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. An apparatus comprising:
 a termination resistor configured to receive multi-level signaling and generate corresponding polarized voltages and currents according to an amplitude of received multi-level signaling;
 a biasing source communicatively coupled to the termination resistor and configured to selectively generate a biasing-voltage level on the termination resistor; and
 a multi-level decoder communicatively coupled across the termination resistor and configured to determine respective entries from a set of compound-index entries according to the polarized voltages and currents across the termination resistor and correspondingly retrieve an associated data symbol from an array of data symbols.

2. The apparatus of claim 1, wherein the termination resistor is configured to receive a plurality of voltage levels corresponding to the received multi-level signaling and generate the corresponding polarized voltages and currents according to the combination of the multi-level signaling and the biasing-voltage level.

3. The apparatus of claim 1, wherein the multi-level decoder includes:
   a level decoder communicatively coupled across the termination resistor and configured to determine a first portion of the respective entries in the set of compound-index entries;
   a current sensor communicatively coupled across the termination resistor and configured to determine a second portion of the respective entries in the set of compound-index entries; and
   a lookup table communicatively coupled to the level decoder and the current sensor, the lookup table includes the array of data symbols and a corresponding index, the lookup table is configured to receive a respective entry from the set of compound-index entries and apply the entry to the index to retrieve the associated data symbol from the array of data symbols.

4. The apparatus of claim 3, wherein the index is configured to uniquely associate the first portion and the second portion of one in the set of compound-index entries with an associated data symbol from the array of data symbols.

5. The apparatus of claim 3, wherein the level decoder is configured to determine a voltage magnitude across the termination resistor during receipt of the multi-level signaling, further wherein each voltage magnitude determines a first portion of the respective entry in the set of compound-index entries.

6. The apparatus of claim 3, wherein the current sensor is configured to determine a direction of current flowing through the termination resistor by measuring a polarity of the voltage across the termination resistor during receipt of the multi-level signaling.

7. The apparatus of claim 3, further comprising a receiver memory communicatively coupled to the lookup table and configured to store data symbols corresponding to the multi-level signaling.

8. The apparatus of claim 1, wherein an amount of power utilized in retrieving the data symbol from the array of data symbols according to a biasing-voltage level of about 33% of a maximum-amplitude-signaling level, is about 57% less than an amount of power utilized in retrieving a further data symbol from the array of data symbols with a biasing-voltage level 0V.

9. A method comprising:
   applying a predetermined biasing-voltage level to a termination resistor communicatively coupled to a data-link terminal of a receiver;
   receiving a pulse-amplitude-modulation signal according to a voltage level across the data-link terminal;
   according to the receiving, measuring a voltage level across, and a current amplitude through the termination resistor;
   according to the measuring, aggregating a compound index including the measured voltage level across and the measured current amplitude through the termination resistor;
   selectively accessing a message symbol in a message symbol array within a multi-level decoder according to the compound index; and
   retrieving the message symbol from the multi-level decoder according to the accessing.

10. The method of claim 9, wherein method further comprising:
    mapping the measured voltage level to a multi-level signaling amplitude;
    mapping the measured current amplitude through the termination resistor to a current direction indicator;
    aggregating the compound index further includes the multi-level signaling amplitude being a first portion and the measured current direction indicator being a second portion of the compound index; and
    transmitting the retrieved message symbol to a receiver memory.

11. The method of claim 10, wherein:
    according to the multi-level signaling amplitude, the pulse-amplitude-modulation signal includes a range of voltage levels and
    the adjusting includes selectively adjusting the magnitude of the biasing-voltage level between about one-third and one-half of a maximum-amplitude-signaling level in the range of voltage levels of the pulse-amplitude-modulation signal.

12. The method of claim 9, wherein the message symbol is an inverted-data symbol, the method further comprising:
    detecting an inversion indication associated with the inverted-data symbol, the inversion indication further associated with a partition of bits within the inverted-data symbol;
    according to the inversion indication, selectively inverting the partition of bits within the inverted-data symbol to produce a data symbol; and
    transmitting the data symbol to a receiver memory.

13. The method of claim 12, wherein the inversion indication signifies that a most-significant partition of the inverted-data symbol is conditionally inverted according to an encoding process.

14. The method of claim 12, wherein:
    the inversion indication signifies that bits within the partition in the inverted-data symbol are inverted according to an encoding process and
    the partition is specified within the encoding process.

15. The method of claim 12, wherein the inversion indication is a binary bit situated within the inverted-data symbol at a bit location separate from a data-designating portion.

16. The method of claim 12, wherein the data symbol includes a pulse-amplitude-modulation signal.

17. The method of claim 9, wherein the message symbol is an inverted-data symbol, the method further comprising:
    detecting an inversion indication associated with the inverted-data symbol;
    decoding the inversion indication into a partition selector and an inversion designator;
    determining a selected partition according to the partition selector, wherein an odd partition is selected when the partition selector is asserted, otherwise an even partition is determined to be selected;
    selectively inverting bits within the selected partition according to the inversion designator, wherein bits within the selected partition are inverted when the inversion designator is asserted, otherwise bits within the selected partition are maintained; and
    transmitting the data symbol to a receiver memory.

18. The method of claim 17, wherein the decoding includes decoding the inversion indication into an ordered pair of binary bits including a first bit corresponding to the partition selector and a second bit corresponding to the inversion designator.

19. The method of claim 17, wherein the inversion indication is a multi-level-inversion symbol encoded to include an ordered pair of binary bits, the ordered pair including a first bit corresponding to the partition selector and a second bit corresponding to the inversion designator.

20. The method of claim 19, wherein the inversion indication is a multi-level-inversion symbol including four signal levels, each signal level corresponding to an encoding of an inversion-specification state determined by the ordered pair.

21. The method of claim 19, wherein:
the inversion indication is a multi-level-inversion symbol including four signal levels encoded into an ordered pair; and
further wherein:
a first bit of the ordered pair determines a selected partition to be an odd partition when asserted and an even partition otherwise, and
a second bit of the ordered pair determines that the selected partition is inverted when asserted and maintained otherwise.

22. An apparatus comprising:
a termination resistor communicatively coupled to a data-link terminal, the termination resistor is configured to receive multi-level signaling through a data link and generate corresponding polarized voltages and currents according to an amplitude of received multi-level signaling;
a biasing source communicatively coupled to the termination resistor and configured to selectively generate a biasing-voltage level on the termination resistor;
a multi-level decoder communicatively coupled across the termination resistor and configured to determine respective entries from a set of compound-index entries according to the polarized voltages and currents across the termination resistor and correspondingly retrieve associated message symbols from an array of transmission symbols; and
an inverted-data decoder communicatively coupled to the multi-level decoder and configured to receive an inversion indication and the associated message symbols, at least a portion of which are inverse-data symbols, and decode inverse-data symbols to data symbols.

23. The apparatus of claim 22, wherein the multi-level decoder includes:
a level decoder communicatively coupled across the termination resistor and configured to determine a first portion of respective entries in the set of compound-index entries;
a current sensor communicatively coupled across the termination resistor and configured to determine a second portion of respective entries in the set of compound-index entries; and
level decode logic communicatively coupled to the level decoder and the current sensor, the level decode logic decodes an array of transmission symbols according to an index, the level decode logic is configured to receive the respective entries from the set of compound-index entries and apply each entry to the index to retrieve an associated message symbol from the array of transmission symbols.

24. The apparatus of claim 22, further comprising a receiver memory communicatively coupled to the inverted-data decoder and configured to store data symbols corresponding to the multi-level signaling.

25. The apparatus of claim 22, wherein:
the inverted-data decoder is configured to decode inverse-data symbols to data symbols by selectively inverting data bits in portions of respective inverse-data symbols according to the inversion indication; and
the inversion indication is associated with an inverse-data symbol when portions of the respective inverse-data symbol are inverted according to an encoding process.

26. The apparatus of claim 22, wherein an amount of power utilized in retrieving the data symbol from the array of message symbols according to a biasing-voltage level of about 50% of a maximum-amplitude-signaling level, is about 64% less than an amount of power utilized in retrieving a further data symbol from the array of message symbols with a biasing-voltage level 0V.

27. A system comprising:
a transmitter memory configured to store and retrieve a data symbol corresponding to a message;
a multi-level encoder communicatively coupled to the transmitter memory and configured to receive a message symbol from the transmitter memory and encode the message symbol to a multi-level transmission symbol;
a transmitter communicatively coupled to the multi-level encoder and configured to transmit the encoded multi-level transmission symbol according to a multi-level signaling protocol;
a raised-floor receiver communicatively coupled to the transmitter and configured to receive the encoded multi-level transmission symbol according to the multi-level signaling protocol;
a receiver memory communicatively coupled to the raised-floor receiver and configured to store data symbols corresponding to the message;
an inverted-data encoder communicatively coupled between the transmitter memory and the multi-level encoder and configured to pre-code the message symbol to an inverted-data symbol;
an inverted-data decoder communicatively coupled between the raised-floor receiver and the receiver memory, the inverted-data decoder configured to decode the inverted-data symbol to a data symbol; and
an inversion-indicator node communicatively coupled between the inverted-data encoder and inverted-data decoder, the inversion-indicator node configured to propagate an inversion indicator from the inverted-data encoder to the inverted-data decoder.

28. The system of claim 27, wherein an amount of power utilized in producing the decoded pre-coded data symbol from the inverted-data decoder, according to a biasing-voltage level of about 50% of a maximum-amplitude-signaling level, is about 71% less than an amount of power utilized in retrieving a further data symbol from the array of data symbols with a further biasing-voltage level 0V.

29. The system of claim 27, wherein the raised-floor receiver comprises:
a termination resistor communicatively coupled to the transmitter, the termination resistor is configured to receive multi-level signaling and generate corresponding polarized voltages and currents;
a biasing source communicatively coupled to the termination resistor and configured to selectively generate a biasing-voltage level on the termination resistor;
a level decoder and a current sensor, each communicatively coupled across the termination resistor, the level decoder is configured to determine a first portion and, the current sensor a second portion, of respective entries of a set of compound-index entries; and
level decode logic communicatively coupled to the level decoder and the current sensor, the level decode logic including an array of message symbols and a corresponding index, the level decode logic is configured to retrieve a message symbol from the array of message symbols upon receipt of a corresponding one of the set of compound-index entries.

* * * * *